(12) United States Patent
Tanaka et al.

(10) Patent No.: US 9,069,412 B2
(45) Date of Patent: *Jun. 30, 2015

(54) TOUCH-SENSOR-EQUIPPED DISPLAY DEVICE COMRPISING PHOTODETECTING ELEMENTS

(75) Inventors: Kohei Tanaka, Osaka (JP); Yasuhiro Sugita, Osaka (JP); Kazuhiro Maeda, Osaka (JP); Hiroaki Sugiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 234 days.

This patent is subject to a terminal disclaimer.

(21) Appl. No.: 13/697,876

(22) PCT Filed: May 19, 2011

(86) PCT No.: PCT/JP2011/061500
§ 371 (c)(1),
(2), (4) Date: Nov. 14, 2012

(87) PCT Pub. No.: WO2011/145677
PCT Pub. Date: Nov. 24, 2011

(65) Prior Publication Data
US 2013/0057528 A1 Mar. 7, 2013

(30) Foreign Application Priority Data
May 20, 2010 (JP) ................................. 2010-116486

(51) Int. Cl.
*G06F 3/038* (2013.01)
*G06F 3/042* (2006.01)
(Continued)

(52) U.S. Cl.
CPC .............. *G06F 3/042* (2013.01); *G06F 3/0412* (2013.01); *G09G 3/3406* (2013.01); *G09G 2360/145* (2013.01)

(58) Field of Classification Search
CPC .................................................. G09G 2360/14
USPC .......................................................... 345/207
See application file for complete search history.

(56) References Cited

U.S. PATENT DOCUMENTS 7,940,252 B2 * 5/2011 Chuang et al. ................. 345/175
8,552,967 B2 * 10/2013 Nakanishi ...................... 345/102
(Continued)

FOREIGN PATENT DOCUMENTS

JP        3521187 B    4/2004
JP    2007-065508 A    3/2007
(Continued)

OTHER PUBLICATIONS

Official Communication issued in International Patent Application No. PCT/JP2011/061500, mailed on Aug. 23, 2011.

*Primary Examiner* — Chanh Nguyen
*Assistant Examiner* — Roy Rabindranath
(74) *Attorney, Agent, or Firm* — Keating & Bennett, LLP

(57) ABSTRACT

Provided is a display device having a photodetecting element in a pixel, and having an input function that is not dependent on light environments. This is a display device having an optical sensor in a pixel region. The optical sensor includes a first sensor pixel circuit that outputs a sensor signal corresponding to electric charges accumulated during an accumulation period in an ON time of a light source for the sensor; and a second sensor pixel circuit that that outputs a sensor signal corresponding to electric charges accumulated during an accumulation period in an OFF time of the light source. A sensor driving circuit for driving the first sensor pixie circuit and the second sensor pixel circuit supplies reset signals (RST1, RST2) to the first sensor pixel circuit and the second sensor pixel circuit, respectively, during vertical flyback periods in pixel display in the pixel region.

7 Claims, 19 Drawing Sheets

(51) Int. Cl.
*G06F 3/041* (2006.01)
*G09G 3/34* (2006.01)

(56) References Cited

U.S. PATENT DOCUMENTS

| | | | |
|---|---|---|---|
| 2006/0103637 A1 | 5/2006 | Yamaguchi et al. | |
| 2010/0110053 A1 | 5/2010 | Katoh et al. | |
| 2010/0134457 A1* | 6/2010 | Katoh et al. | 345/207 |
| 2013/0063403 A1* | 3/2013 | Sugita et al. | 345/175 |
| 2013/0063407 A1* | 3/2013 | Usukura et al. | 345/207 |

FOREIGN PATENT DOCUMENTS

| | | | |
|---|---|---|---|
| JP | 2007-304342 A | | 11/2007 |
| JP | 2007-334606 A | | 12/2007 |
| JP | 4072732 B | | 4/2008 |
| JP | 2009-217461 A | | 9/2009 |
| WO | 2008/126768 | * | 10/2008 |
| WO | 2008/126871 A1 | | 10/2008 |

* cited by examiner

TOUCH-SENSOR-EQUIPPED DISPLAY DEVICE COMRPISING PHOTODETECTING ELEMENTS

TECHNICAL FIELD

The present invention relates to a display device, particularly to a display device having a pixel region provided with a plurality of optical sensors.

BACKGROUND ART

Conventionally, relating to a display device, a method of providing a plurality of optical sensors in a display panel so as to provide an input function such as a touch panel, pen inputting, or a scanner, etc. has been known. In order to apply this method to a mobile machine used in various light environments, it is necessary to eliminate influences of light environments. Then, a method for determining a signal to be input by removing a component depending on light environments from a signal detected by an optical sensor has been known as well.

JP4072732B discloses that, in an input/output device in which light-receiving elements are provided so as to correspond to display elements, respectively, the reset and the readout are carried out line-sequentially with respect to the light-receiving elements, by blinking a backlight once during one frame period, so that an amount of light during a backlight ON period, and an amount of light during a backlight OFF period are obtained from all of the light-receiving elements during one frame period.

FIG. 22 shows backlight ON and OFF timings and reset and readout timings with respect to light-receiving elements disclosed in JP4072732B. As shown in FIG. 22, the backlight is on during a former half of one frame period, and is off during a latter half of the same. During the backlight ON period, the reset is carried out line-sequentially with respect to the light-receiving elements (solid line arrows), and the readout is carried out line-sequentially with respect to the light-receiving elements (broken line arrows). During the backlight OFF period as well, the reset and the readout with respect to the light-receiving elements are carried out in the same manner.

JP3521187B shows a solid image pickup device having a unit light-receiving part shown in FIG. 23. The unit light-receiving part shown in FIG. 23 includes one photoelectric conversion portion PD and two charge accumulation portions C1 and C2. When both of reflection light from an object that reflects light from a light emitting means and external light are received, a first sample gate SG1 is turned on, and electric charges generated by the photoelectric conversion portion PD are accumulated in the first charge accumulation portion C1. When only external light is received, a second sample gate SG2 is turned on, and charges generated by the photoelectric conversion portion PD are accumulated in the second electric charge accumulation portion C2. A difference between amounts of charges accumulated in the two charge accumulation portions C1 and C2 is determined, whereby an amount of light reflected by an object that reflects light from a light emitting means can be determined.

Generally, in a display device including a plurality of optical sensors in a display panel, the readout from optical sensors is carried out line-sequentially. A backlight for mobile equipment is turned on at once, and is turned off at once, for the entire screen.

An input/output device disclosed in JP4072732B carries out the reset and the readout during respective non-overlapping periods in a backlight ON period, by blinking a backlight once during one frame period, and carries out the reset and the readout during respective non-overlapping periods in a backlight OFF period as well. Therefore, it is necessary to carry out the readout from light-receiving elements within a ¼ frame period (e.g., within 1/240 second in the case where the frame rate is 60 frames/second). Practically, however, it is considerably difficult to carry out such a high-speed readout.

Further, a period in which light-receiving elements detect light during a backlight ON period (B1 shown in FIG. 22) and a period in which light-receiving elements detect light during a backlight OFF period (B2 shown in FIG. 22) deviate by ½ frame period from each other. Therefore, the followability with respect to motion input fluctuates depending on an input direction. Besides, this input/output device starts readout immediately after the completion of reset, and the reset is started immediately after the completion of readout. Therefore, lengths and intervals of the backlight ON period and the backlight OFF period cannot be determined freely.

Further, this input/output device detects an amount of light during the backlight ON period and an amount of light during the backlight OFF period with the same light-receiving elements. Therefore, when an amount of light during the backlight ON period is detected with a certain light-receiving element, the detection of an amount of light during the backlight OFF period by the light-receiving element concerned cannot be started until the readout of the amount of light that has been detected by the light-receiving element concerned during the backlight ON period is completed.

DISCLOSURE OF THE INVENTION

Therefore, it is an object of the present invention to solve the above-described problem, and to provide a display device having an input function that is not dependent on light environments.

In order to achieve the above-described object, a display device disclosed herein is a display device including an active matrix substrate, and the display device has a configuration that includes: an optical sensor provided in a pixel region of the active matrix substrate; a sensor driving line connected to the optical sensor; a sensor driving circuit that supplies sensor driving signals including a reset signal and a readout signal via the sensor driving line to the optical sensor; an amplifying circuit that amplifies the signal read out from the optical sensor according to the sensor driving signals, and outputs the amplified signal as an optical sensor signal; a signal processing circuit that processes the optical sensor signal that is output from the amplifying circuit; and a light source for the optical sensor, wherein the optical sensor includes: a first sensor pixel circuit that, according to the sensor driving signal, accumulates electric charges corresponding to an amount of light received during an accumulation period in an ON time of the light source, and outputs a sensor signal corresponding to the accumulated electric charges when a readout period starts; and a second sensor pixel circuit that, according to the sensor driving signal, accumulates electric charges corresponding to an amount of light received during an accumulation period in an OFF time of the light source, and outputs a sensor signal corresponding to the accumulated electric charges when a readout period starts, wherein the sensor driving circuit supplies the reset signal to the optical sensor during a vertical flyback period in pixel display in the pixel region.

With the present invention, it is possible to provide a display device having a photodetecting element within a pixel, and particularly having an input function that is not dependent on light environments.

EMBODIMENTS FOR CARRYING OUT THE INVENTION

Figure 1:
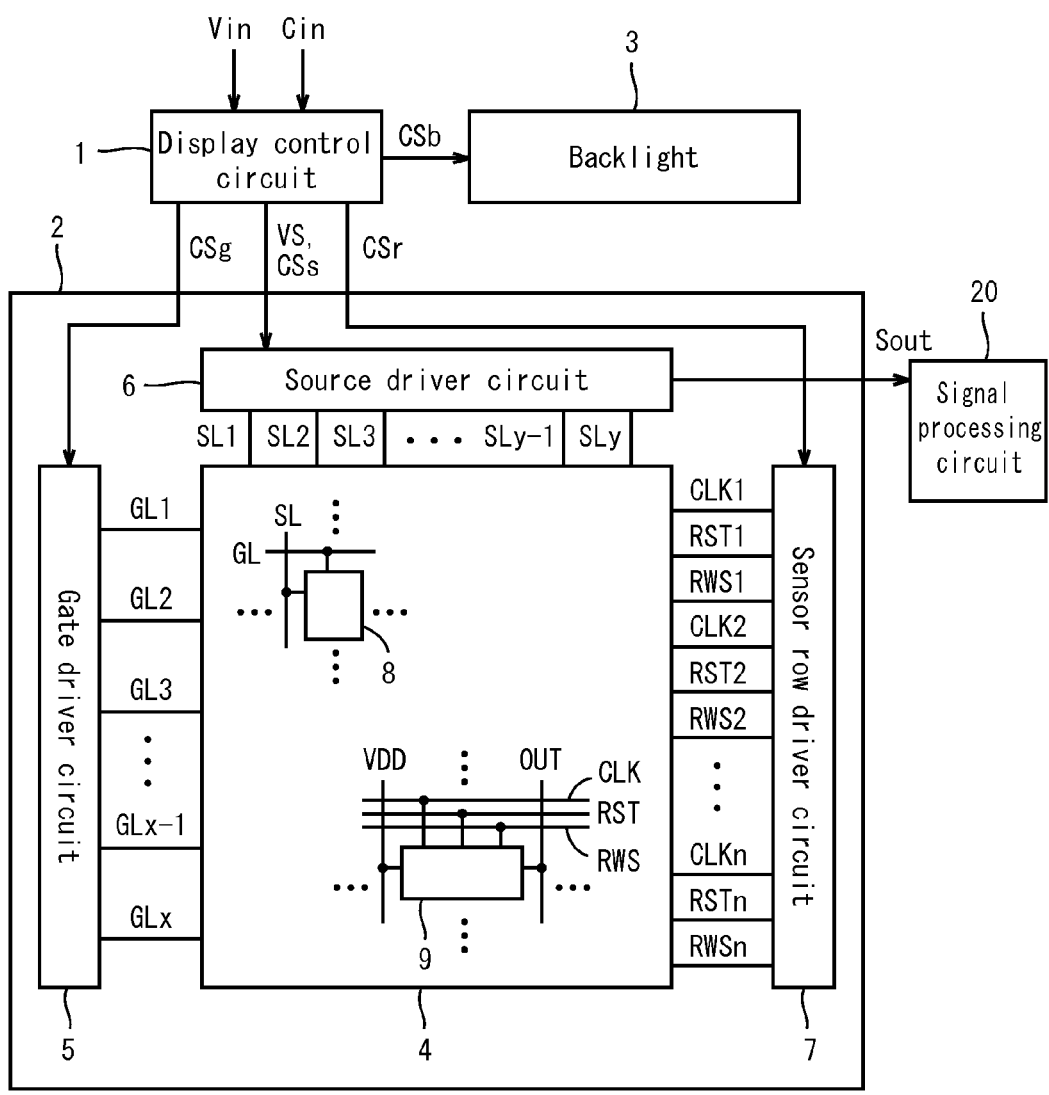
FIG. 1 is a block diagram showing a configuration of a display device according to an embodiment of the present invention.

A display device according to one embodiment of the present invention is a display device that includes an active matrix substrate, and the display device has a configuration that includes: an optical sensor provided in a pixel region of the active matrix substrate; a sensor driving line connected to the optical sensor; a sensor driving circuit that supplies sensor driving signals including a reset signal and a readout signal via the sensor driving line to the optical sensor; an amplifying circuit that amplifies the signal read out from the optical sensor according to the sensor driving signals, and outputs the amplified signal as an optical sensor signal; a signal processing circuit that processes the optical sensor signal that is output from the amplifying circuit; and a light source for the optical sensor, wherein the optical sensor includes: a first sensor pixel circuit that, according to the sensor driving signal, accumulates electric charges corresponding to an amount of light received during an accumulation period in an ON time of the light source, and outputs a sensor signal corresponding to the accumulated electric charges when a readout period starts; and a second sensor pixel circuit that, according to the sensor driving signal, accumulates electric charges corresponding to an amount of light received during an accumulation period in an OFF time of the light source, and outputs a sensor signal corresponding to the accumulated electric charges when a readout period starts, wherein the sensor driving circuit supplies the reset signal to the optical sensor during a vertical flyback period in pixel display in the pixel region (first configuration).

The first configuration can be modified, for example, so that each of the first and second pixel circuits includes: one light-receiving element; one accumulation node that accumulates electric charges corresponding to an amount of light detected; a readout transistor having a control terminal that is electrically connectable to the accumulation node; and a switching element for retention that is provided on a path of an electric current flowing through the light-receiving element and that is turned on/off according to the control signal (second configuration).

This second configuration is preferably modified so that, in the first and second sensor pixel circuits, the switching element of retention is provided between the accumulation node and one terminal of the light-receiving element, and the other terminal of the light-receiving element is connected to a reset line (third configuration).

The first configuration may be modified so that the first and second sensor pixel circuits share one light-receiving element, and one terminal of the light-receiving element is connected to one terminal of a switching element for retention included in each of the first and second sensor pixel circuits, and the other terminal of the light-receiving element is connected to a reset line (fourth configuration).

The first to fourth configurations are preferably modified so that interlace driving is performed with respect to pixels in the pixel region, and the sensor driving circuit supplies the reset signal to the optical sensor during a vertical flyback period, two of the vertical flyback periods being provided in one frame relating to pixel display in the pixel region (fifth configuration).

The first to fifth configurations are preferably modified so that in one frame period, the accumulation period in the ON time of the light source precedes the accumulation period in the OFF time of the light source (sixth configuration).

The first to sixth configurations are preferably modified so as to further include: a counter substrate opposed to the active matrix substrate; and liquid crystal interposed between the active matrix substrate and the counter substrate (seventh configuration).

Embodiment

Hereinafter, more specific embodiments of the present invention are explained with reference to the drawings. It should be noted that the following embodiments show exemplary configurations in the case where a display apparatus according to the present invention is embodied as a liquid crystal display device, but the display apparatus according to the present invention is not limited to a liquid crystal display device, and the present invention is applicable to an arbitrary display apparatus in which an active matrix substrate is used. It should be noted that a display apparatus according to the present invention, as having an image capturing function, is assumed to be used as a touch-panel-equipped display device that detects an object approaching its screen and carries out an input operation, as a display apparatus for two-way communication having a display function and an image pickup function, etc.

Further, the drawings referred to hereinafter show, in a simplified manner, only principal members needed for explanation of the present invention among composing members of the embodiment of the present invention, for convenience of explanation. Therefore, a display apparatus according to the present invention may include arbitrary members that are not shown in the drawings that the present specification refers to. Further, the dimensions of the members shown in the drawings do not faithfully reflect actual dimensions of component members, dimensional ratios of the members, etc.

Embodiment 1

FIG. 1 is a block diagram showing a configuration of a display device according to Embodiment 1 of the present invention. The display device shown in FIG. 1 includes a display control circuit 1, a display panel 2, and a backlight 3. The display panel 2 includes a pixel region 4, a gate driver circuit 5, a source driver circuit 6, and a sensor row driver circuit 7 (sensor driving circuit). The pixel region 4 includes a plurality of display pixel circuits 8 and a plurality of sensor pixel circuits 9. This display device has a function of displaying images on the display panel 2, and a function of detecting light incident on the display panel 2. Hereinafter, x represents an integer of 2 or more, y represents a multiple of 3, m and n represent even numbers, and the frame rate of the display device is set to 60 frames/sec.

To the display device shown in FIG. 1, video signals Vin and timing control signals Cin are supplied from outside. Based on these signals, the display control circuit 1 outputs a video signal VS and control signals CSg, CSs, and CSr to the display panel 2, and outputs a control signal CSb to the backlight 3. The video signal VS may be identical to the video signal Vin, or may be a signal obtained by subjecting the video signal Vin to signal processing.

The backlight 3 is a light source for sensing, provided separately from a light source for display, and projects light to the display panel 2. More specifically, the backlight 3 is provided on a back face side of the display panel 2, and irradiates the back face of the display panel 2 with light. The backlight 3 is turned on when the control signal CSb is at a high level, and is turned off when the control signal CS b is at a low level. As the backlight 3, an infrared light source, for example, can be used.

In the pixel region 4 of the display panel 2, display pixel circuits 8 which are (x×y) in number and sensor pixel circuits 9 which are (n×m/2) in number are arrayed two-dimensionally. More specifically, in the pixel region 4, x gate lines GL1 to GLx and y source lines SL1 to SLy are provided. The gate lines GL1 to GLx are arrayed in parallel, and the source lines SL1 to SLy are arrayed in parallel so as to be perpendicular to the gate lines GL1 to GLx. The (x×y) display pixel circuits 8 are arrayed in the vicinities of intersections of the gate lines GL1 to GLx and the source lines SL1 to SLy. Each display pixel circuit 8 is connected to one gate line GL and one source line SL. The display pixel circuits 8 are classified as those for red display, those for green display, and those for blue display. The display pixel circuits 8 classified as these three types are arrayed in a direction parallel with the extending direction of the gate lines GL1 to GLx, and each set of the same composes one color pixel.

In the pixel region 4, n clock lines CLK1 to CLKn, n reset lines RST1 to RSTn, and n readout lines RWS1 to RWSn are provided in parallel with the gate lines GL1 to GLx. Further, in the pixel region 4, other signal lines and power source lines (not shown) are provided in parallel with the gate lines GL1 to GLx, in some cases. Upon readout from the sensor pixel circuits 9, m source lines selected out of the source line SL1 to SLy are used as power source lines VDD1 to VDDm, and another m source lines selected from the same are used as output lines OUT1 to OUTm.

Figure 2:
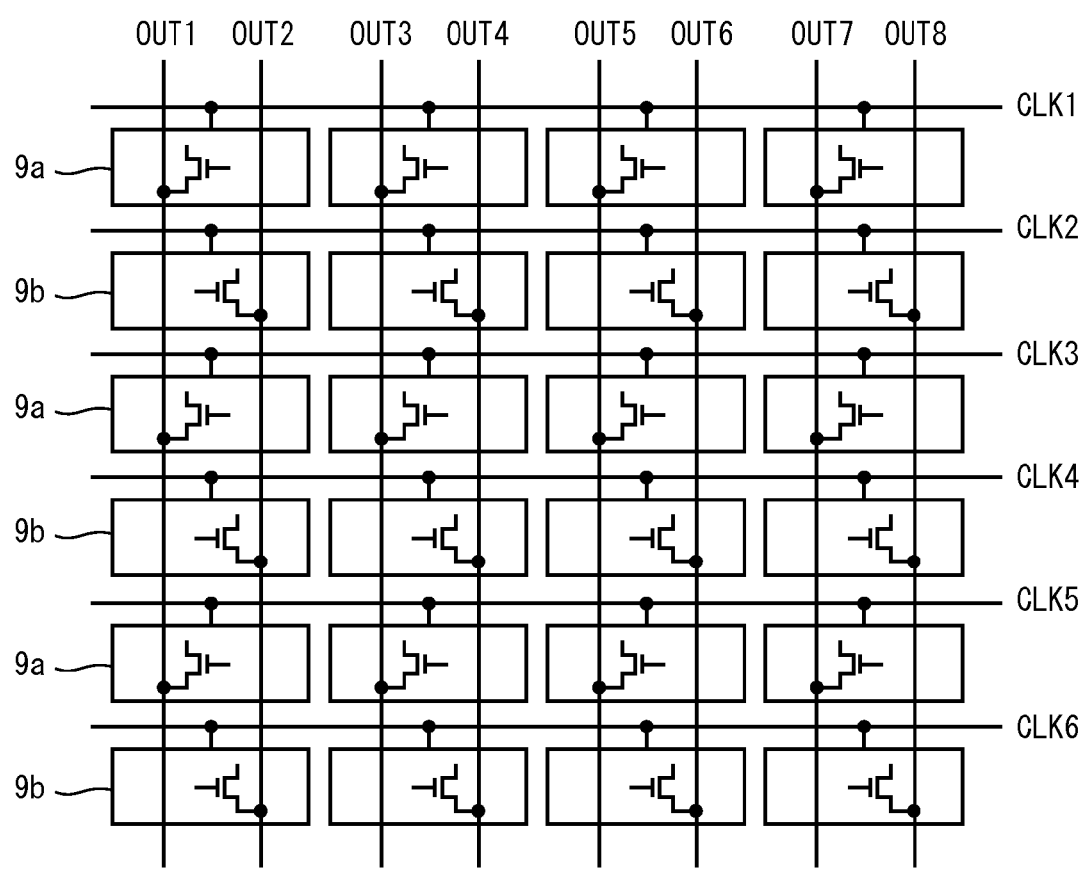
FIG. 2 shows an arrangement of sensor pixel circuits in a display panel incorporated in the display device shown in FIG. 1.

FIG. 2 shows an arrangement of the sensor pixel circuits 9 in the pixel region 4. The (n×m/2) sensor pixel circuits 9 include first sensor pixel circuits 9a that detect light that is incident during the backlight 3 ON period, and second sensor pixel circuits 9b that detect light that is incident during the backlight 3 OFF period. The number of the first sensor pixel circuits 9a and the number of the second sensor pixel circuits 9b are the same in number. In FIG. 2, (n×m/4) among the first sensor pixel circuits 9a are arranged in the vicinities of intersections of the odd-number-th clock lines CLK1 to CLKn-1 and the odd-number-th output lines OUT1 to OUTm-1. (n×m/4) among the second sensor pixel circuits 9b are arranged in the vicinities of intersections of the even-number-th clock lines CLK2 to CLKn and the even-number-th output lines OUT2 to OUTm. Thus, the display panel 2 includes a plurality of output lines OUT1 to OUTm that transmit output signals of the first sensor pixel circuits 9a and output signals of the second sensor pixel circuits 9b, and the first sensor pixel circuits 9a and the second sensor pixel circuits 9b are connected to different output lines, depending on the types, respectively.

The gate driver circuit 5 drives gate lines GL1 to GLx. More specifically, the gate driver circuit 5 sequentially selects one out of the gate lines GL1 to GLx according to the control signal CSg, and applies a high-level potential to the selected gate line, and applies a low-level potential to the other gate lines. Thus, y display pixel circuits 8 connected to the selected gate line are selected at once.

The source driver circuit 6 drives source lines SL1 to SLy. More specifically, the source driver circuit 6 applies potentials corresponding to video signals VS, respectively, to the source lines SL1 to SLy according to the control signal CSs. Here, the source driver circuit 6 may perform line-sequential driving, or dot-sequential driving. Potentials applied to the source lines SL1 to SLy are written in y display pixel circuits 8 selected by the gate driver circuit 5. Thus, by writing potentials corresponding to the video signals VS in all of the display pixel circuits 8 with use of the gate driver circuit 5 and the source driver circuit 6, a desired image can be displayed on the display panel 2.

The sensor row driver circuit 7 drives the clock lines CLK1 to CLKn, the reset lines RST1 to RSTn, the readout lines RWS1 to RWSn, and the like. More specifically, the sensor row driver circuit 7 applies a high-level potential and a low-level potential to the clock lines CLK1 to CLKn at timings shown in FIG. 4 (to be described in detail later), according to the control signal CSr. The sensor row driver circuit 7 selects (n/2) or 2 reset lines out of the reset lines RST1 to RSTn, and applies a high-level potential for reset to the selected reset lines, and a low-level potential to the other reset lines, according to the control signal CSr. This causes the (n×m/4) or m sensor pixel circuits 9 connected to the reset lines to which the high-level potential is applied to be reset at once.

The sensor row driver circuit 7 sequentially selects two adjacent readout lines out of the readout lines RWS1 to RWSn, and applies a high-level potential for readout to the selected readout lines, and a low-level potential to the other readout lines, according to the control signal CSr. Thus, the m sensor pixel circuits 9 connected to the two readout lines thus selected assume a state of being ready for readout at once. Here, the source driver circuit 6 applies a high-level potential to the power source lines VDD1 to VDDm. In this way, from the m sensor pixel circuits 9 assuming a state of being ready for readout, signals corresponding to amounts of light detected by the respective sensor pixel circuits 9 (hereinafter referred to as sensor signals) are output to the output lines OUT1 to OUTm, respectively.

The source driver circuit 6 includes a difference circuit (not shown) that determines a difference between an output signal of the first sensor pixel circuit 9a and an output signal of the second sensor pixel circuit 9b. The source driver circuit 6 includes an amplifier circuit (not shown) that amplifies a light amount difference determined by the difference circuit. The source driver circuit 6 outputs the amplified signal as a sensor output Sout to outside the display panel 2. The sensor output Sout is subjected to an appropriate processing as required by the signal processing circuit 20 provided outside the display panel 2. By reading out sensor signals from all the sensor pixel circuits 9 with use of the source driver circuit 6 and the sensor row driver circuit 7, light incident on the display panel 2 can be detected.

Figure 3:
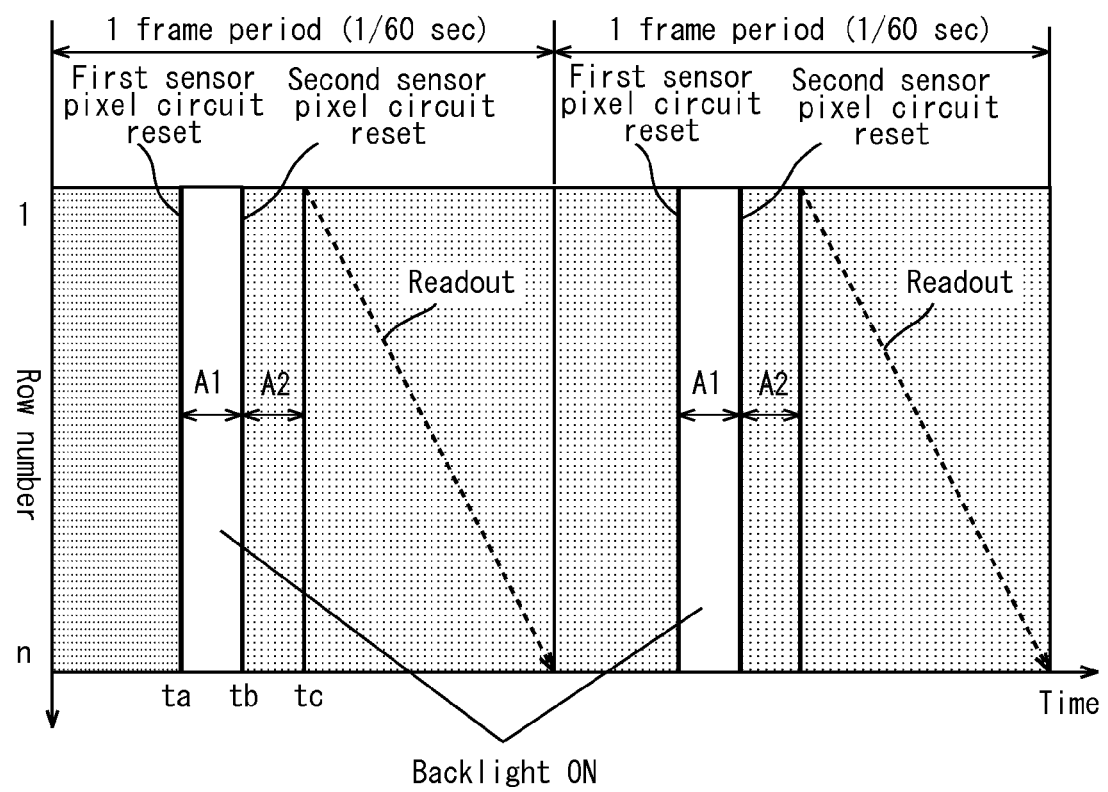
FIG. 3 shows backlight ON and OFF timings, and reset and readout timings with respect to the sensor pixel circuits, in the display device shown in FIG. 1.

FIG. 3 shows ON and OFF timings of the backlight 3, and reset and readout timings with respect to the sensor pixel circuit 9. The backlight 3 is turned on only for a predetermined time, once during one frame period, and remains off during the other period. More specifically, the backlight 3 is turned on at a time ta and is turned off at a time tb in one frame period. At the time ta, the reset is carried out with respect to all the first sensor pixel circuits 9a, and at the time tb, the reset is carried out with respect to all the second sensor pixel circuits 9b.

The first sensor pixel circuit 9a detects light that is incident during a period A1 (the ON period of the backlight 3) from the time ta to the time tb. The second sensor pixel circuit 9b detects light that is incident during a period A2 (the OFF period of the backlight 3) from the time tb to a time tc. The periods A1 and A2 has the same length. The readout from the first sensor pixel circuits 9a and the readout from the second sensor pixel circuits 9b are carried out in parallel line-sequentially after the time tc. It should be noted that though the readout from the sensor pixel circuits 9 is completed within one frame period in FIG. 3, the readout may be completed by the time when the reset with respect to the first sensor pixel circuits 9a is carried out in the next frame period.

Figure 4:
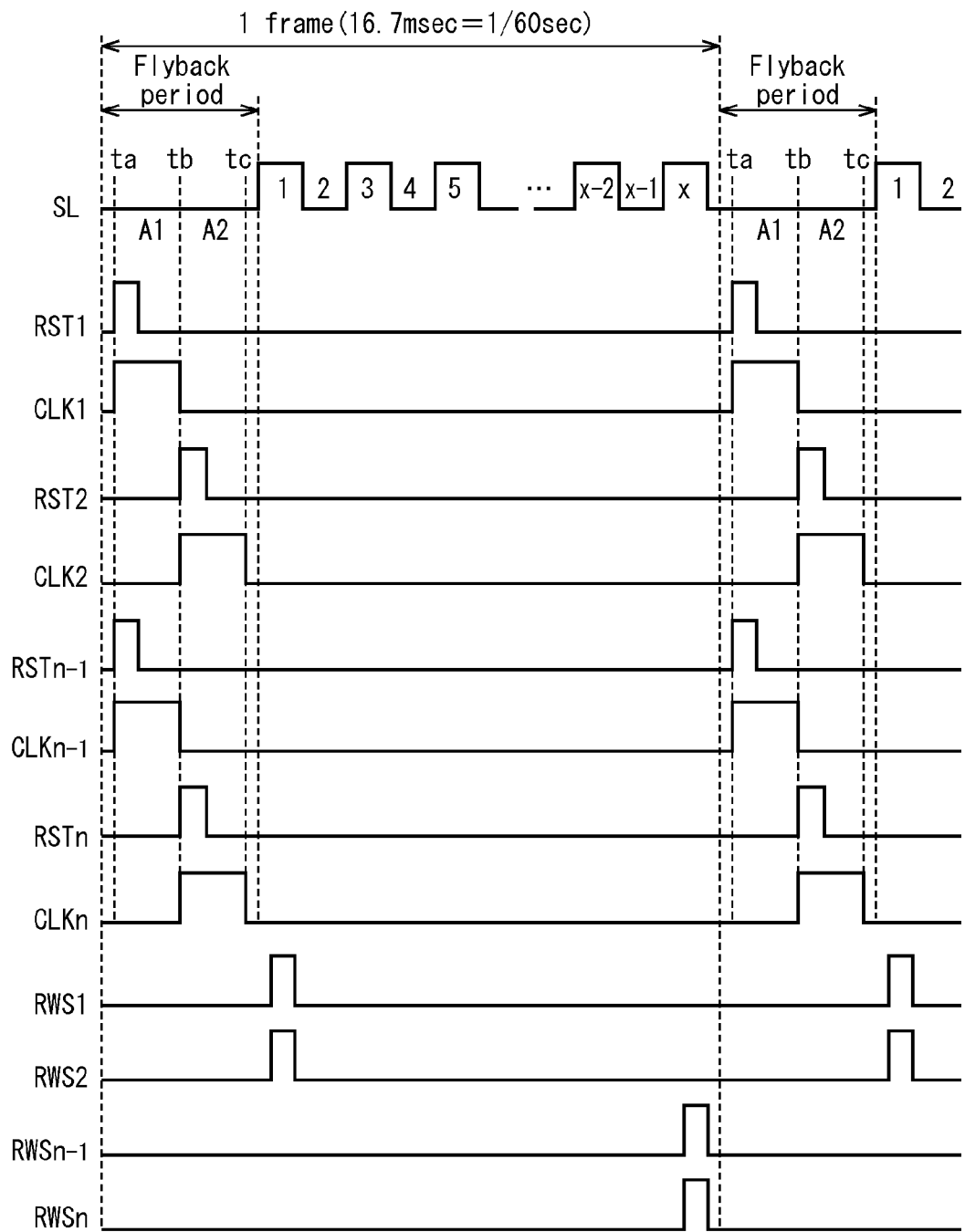
FIG. 4 is a signal waveform diagram of the display panel of the display device shown in FIG. 1.

FIG. 4 is a signal waveform diagram of the display panel 2 for the driving at the timings shown in FIG. 3. It should be noted that the width and height of each pulse shown in FIG. 4 do not faithfully represent actual pulse amplitudes and widths.

Though not shown in FIG. 4, potentials of the gate lines GL1 to GLx assume high levels one by one sequentially, each for a predetermined time once during one frame period. The source lines SL1 to SLy are given potentials according to data signals for display after an end of a vertical flyback period in each frame, as shown in FIG. 4.

As shown in FIG. 4, potentials of the odd-number-th clock lines CLK1 to CLKn-1 assume high levels once in one frame period, during a period A1 (strictly, from the time to to slightly before the time tb). Potentials of the even-number-th clock lines CLK2 to CLKn assume high levels once in one frame period, during a period A2 (strictly, from the time tb to slightly before the time tc). Potentials of the odd-number-th reset lines RST1 to RSTn-1 assume high levels once in one frame period, at a beginning of the period A1, only for a predetermined time. Potentials of the even-number-th reset lines RST2 to RSTn assume high levels once in one frame period, at a beginning of the period A2, only for a predetermined time. Two of the readout lines RWS1 to RWSn are paired, and potentials of (n/2) pairs assume high levels one by one sequentially after the vertical flyback period, for a predetermined time each.

Figure 5:
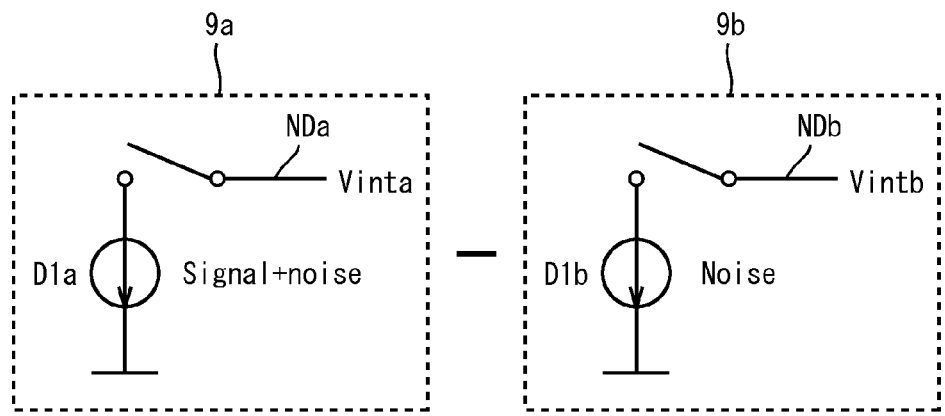
FIG. 5 shows a schematic configuration of the sensor pixel circuit incorporated in the display device shown in FIG. 1.

FIG. 5 shows a schematic configuration of the sensor pixel circuit 9. As shown in FIG. 5, the first sensor pixel circuit 9a includes one photodiode D1a, and one accumulation node NDa. The photodiode D1a withdraws charges corresponding to an amount of light that is incident while the backlight 3 is being on (signal+noise), from the accumulation node NDa. The second sensor pixel circuit 9b includes one photodiode D1b, and one accumulation node NDb, as is the case with the first sensor pixel circuit 9a. The photodiode D1b withdraws charges corresponding to an amount of light that is incident while the backlight 3 is off (noise), from the accumulation node NDb. From the first sensor pixel circuit 9a, a sensor signal Vinta is read out that corresponds to an amount of light that is incident during a detection period in the ON time of the backlight 3 (the period while the reset line RST assumes the low level, in the period A1). From the second sensor pixel circuit 9b, a sensor signal Vintb is read out that corresponds to an amount of light that is incident during a detection period in the OFF time of the backlight 3 (the period while the reset line RST assumes the low level, in the period A2). By determining a difference between the output signal Vinta from the first sensor pixel circuit 9a and the output signal Vintb from the second sensor pixel circuit 9b with use of the difference circuit contained in the source driver circuit 6, a difference between an amount of light during the backlight ON time and an amount of light during the backlight OFF time can be determined as described above.

It should be noted that the number of the sensor pixel circuits 9 provided in the pixel region 4 may be arbitrary. However, it is preferable that the first sensor pixel circuits 9a and the second sensor pixel circuits 9b are connected to different output lines. For example, in the case where (n×m) sensor pixel circuits 9 are provided in the pixel region 4, n first sensor pixel circuits 9a may be connected to the odd-number-th output lines OUT1 to OUTm-1, respectively, and n second sensor pixel circuits 9b may be connected to the even-number-th output lines OUT2 to OUTm, respectively. In this case, the readout from the sensor pixel circuits 9 is carried out row by row. Alternatively, the same number of sensor pixel circuits 9 as the number of color pixels (i.e., the number is (x×y/3)) may be provided in the pixel region 4. Further alternatively, sensor pixel circuits 9 less than the number of color pixels (e.g., the number is a fraction of the number of color pixels to one several-ten-th of the same) may be provided.

Thus, the display device according to the embodiment of the present invention is a display device having a plurality of photodiodes (optical sensors) in the pixel region 4, which includes a display panel 2 that includes a plurality of display pixel circuits 8, and a plurality of sensor pixel circuits 9; and a sensor row driver circuit 7 (driving circuit) that outputs the clock signal CLK (control signal) indicating a detection period in a backlight ON time and a detection period in a backlight OFF time to the sensor pixel circuits 9. Hereinafter, details of the sensor pixel circuit 9 incorporated in this display device are explained. In the following explanation, the sensor pixel circuit is abbreviated as a "pixel circuit", and a signal on a signal line is referred to by using the same name as the name of the signal line so that signals are distinguished from one another (e.g., a signal on a clock line CLKa is referred to as a "clock signal CLKa").

The first sensor pixel circuit 9a is connected to a clock line CLKa, a reset line RSTa, a readout line RWSa, a power source line VDDa, and an output line OUTa. The second sensor pixel circuit 9b is connected to a clock line CLKb, a reset line RSTb, a readout line RWSb, a power source line VDDb, and an output line OUTb. In these embodiments, the second sensor pixel circuit 9b has the same configuration as that of the first sensor pixel circuit 9a, and operates in the same manner as that of the first sensor pixel circuit 9a. Therefore, explanation about the second sensor pixel circuit 9b is omitted where appropriate.

Figure 6:
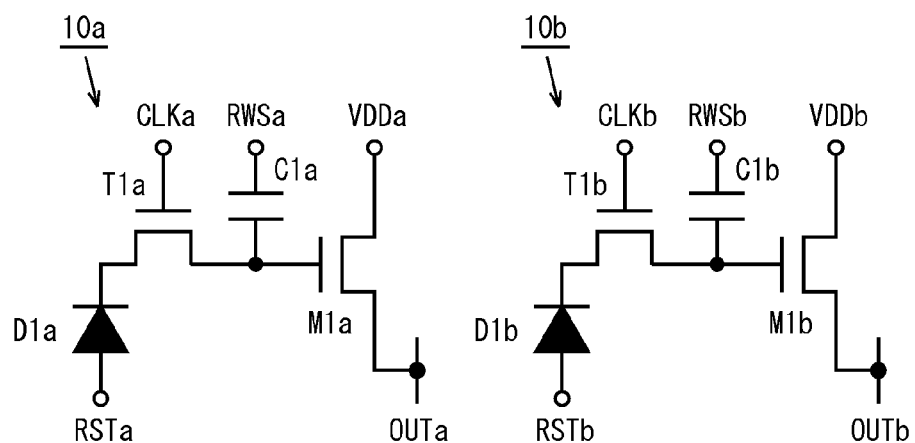
FIG. 6 is a circuit diagram of the sensor pixel circuit according to Embodiment 1 of the present invention.

FIG. 6 is a circuit diagram showing an exemplary specific configuration of the first sensor pixel circuit 9a and the second sensor pixel circuit 9b. In the present embodiment, the first pixel circuit 10a shown in FIG. 6 is one specific example of the above-described first sensor pixel circuit 9a, and the second pixel circuit 10b is one specific example of the above-described second sensor pixel circuit 9b. As shown in FIG. 6, the first pixel circuit 10a includes transistors T1a and M1a, a photodiode D1a, and a capacitor C1a. The second pixel circuit 10b includes transistors T1b and M1b, a photodiode D1b, and a capacitor C1b. The transistors T1a, M1a, T1b, and M1b are N-type TFTs (thin film transistors).

In the first pixel circuit 10a, an anode of the photodiode D1a is connected to the reset line RSTa, and a cathode thereof is connected to a source of the transistor T1a. A gate of the transistor T1a is connected to the clock line CLKa, and a drain thereof is connected to a gate of the transistor M1a. A drain of the transistor M1a is connected to the power source line VDDa, and a source thereof is connected to the output line OUTa. The capacitor C1a is provided between the gate of the transistor M1a and the readout line RWSa. In the first pixel circuit 10a, a node connected to the gate of the transistor M1a functions as an accumulation node that accumulates charges corresponding to an amount of light detected, and the transistor M1a functions as a readout transistor. The second pixel circuit 10b has the same configuration as that of the first pixel circuit 10a. It should be noted that the power source line VDDa doubles as the source line SL. The output line OUTa also doubles as the source line SL.

Figure 7:
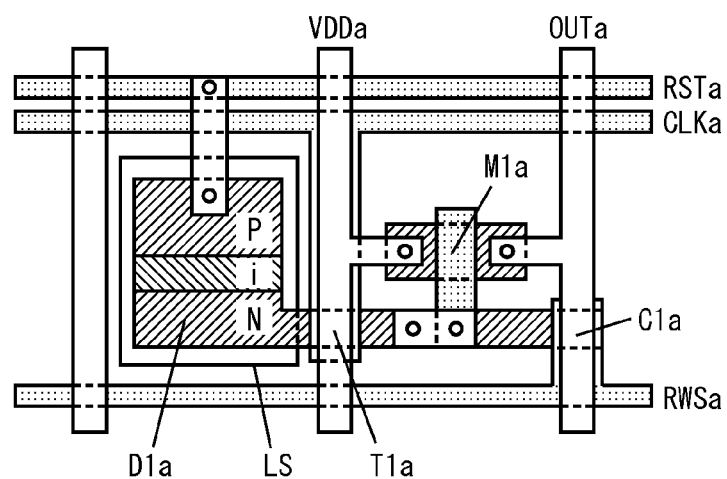
FIG. 7 is a layout diagram of the sensor pixel circuit shown in FIG. 6.

FIG. 7 is a layout diagram of the first pixel circuit 10a. As shown in FIG. 7, the first pixel circuit 10a is composed of a light shielding film LS, a semiconductor layer (hatched part), a gate line layer (dotted part), and a source line layer (void part) that are formed in the stated order on a glass substrate. At positions where the semiconductor layer and the source line layer are connected, and positions where the gate line layer and the source line layer are connected, contacts are provided (indicated by white circles). The transistors T1a and M1a are formed by arranging the semiconductor layer and the gate line layer in such a manner that they cross each other. The photodiode D1a is formed by arranging a P layer, an I layer, and an N layer as semiconductor layers side by side. The capacitor C1a is formed by arranging a semiconductor layer and a gate line layer in such a manner that they overlap each other. The light shielding film LS is made of a metal, and prevents light from a back side of the substrate from becoming incident on the photodiode D1a. The second pixel circuit 10b is laid out in the same manner as that of the first pixel circuit 10a. It should be noted that the first and second pixel circuits 10a and 10b may be laid out in a different manner than the above-described manner. As is clear from FIG. 7, the power source line VDDa and the output line OUTa double as the source lines SL.

Figure 8:
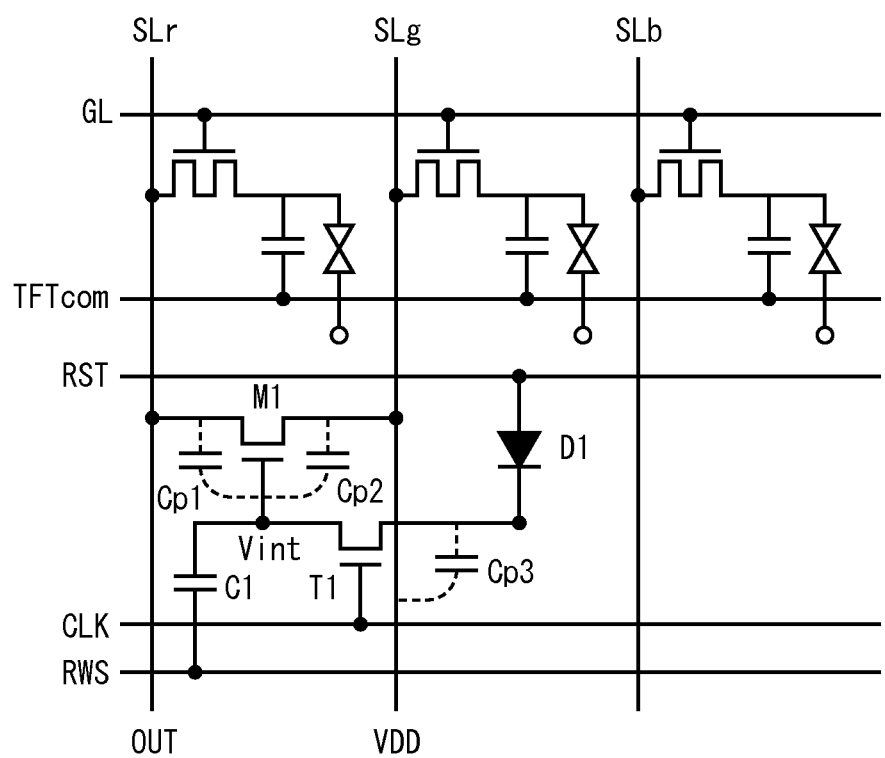
FIG. 8 is an equivalent circuit diagram showing an exemplary arrangement of display pixel circuits and sensor pixel circuits.

FIG. 8 is an equivalent circuit diagram showing a connection relationship between display pixel circuits and sensor pixel circuits in the case where the sensor pixel circuits 9 assume the configuration of the first and second pixel circuits 10a and 10b. It should be noted that FIG. 8 is an equivalent circuit diagram, and does not limit physical positions of respective elements. In the exemplary configuration shown in FIG. 8, the power source line VDD connected to the source electrode of the transistor M1 doubles as a source line SLg for supplying data signals to a pixel for green display, and the output line OUT connected to the drain electrode of the transistor M1 doubles as a source line SLr for supplying data signals to a pixel for red display.

As shown in FIG. 8, the potential Vint of the accumulation node is influenced by fluctuations of the potential of the source line SL due to coupling capacitances (Cp1, Cp2, and Cp3) with the source line SL. Particularly, when the accumulation node potential Vint exceeds a predetermined reset potential (a high level potential of the reset signal RST) due to influences of fluctuations of the potential of the source line LS during the reset of the sensor circuits, the diode D1 is shifted to a state in which a reverse bias is applied thereto, whereby diode current decreases significantly. Thus, it becomes difficult to cause the accumulation node potential Vint to have the predetermined reset potential again. In other words, depending on a potential supplied to the source line SL, a noise component occurs in the accumulation node potential Vint upon reset, and this results in that the noise component is contained in a sensor output. In the display device of the present embodiment, however, as shown in FIG. 4, the reset of the first pixel circuit 10a and the second pixel circuit 10b are carried out during the vertical flyback period, in which no fluctuation occurs in the potential of the source line SL. Therefore, any noise component due to the potential fluctuation of the source line SL is not generated upon the reset of the first pixel circuit 10a and the second pixel circuit 10b. This makes it possible to obtain a high-precision sensor output.

Figure 9:
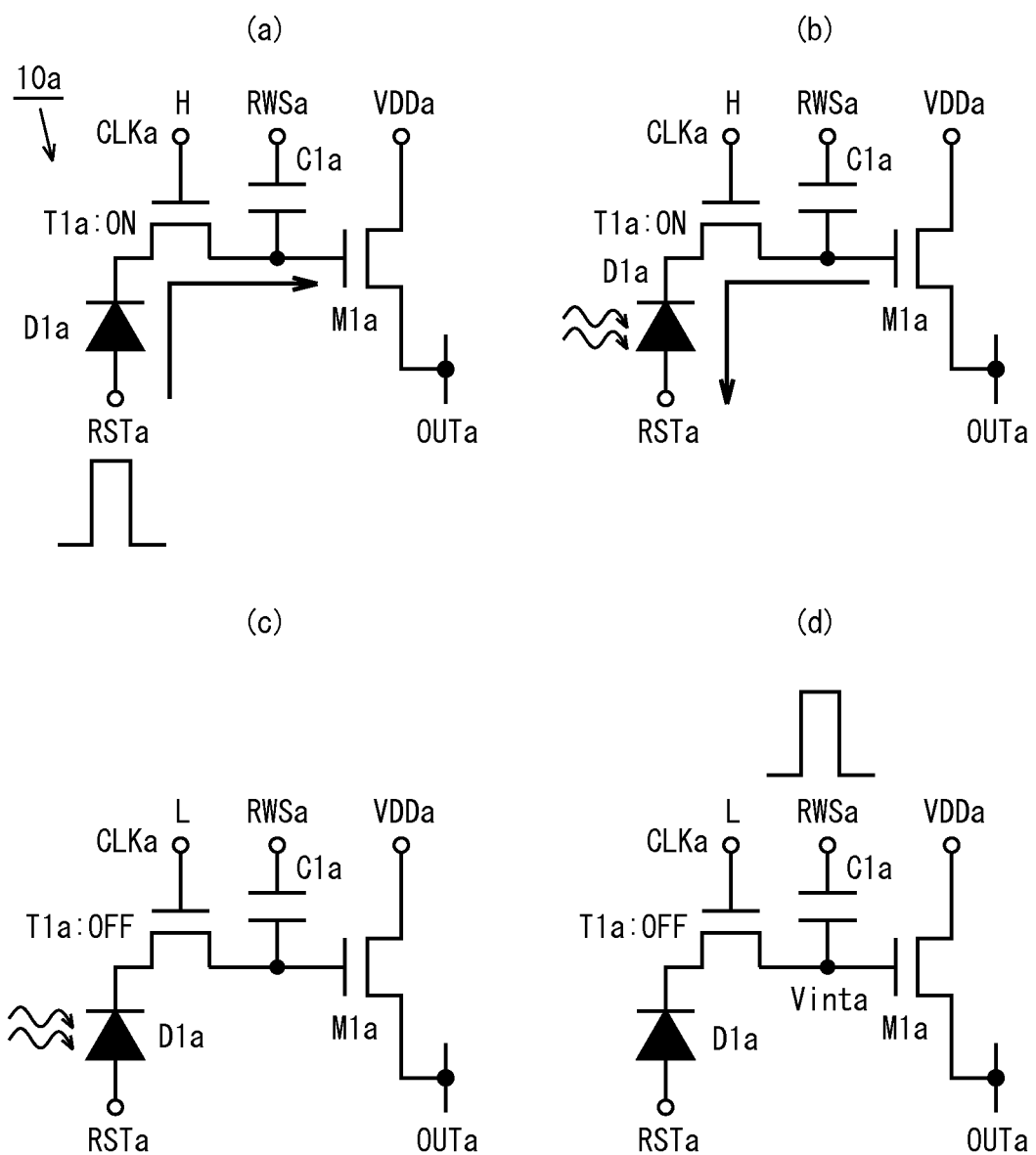
FIG. 9 shows operations of the sensor pixel circuit shown in FIG. 6.

FIG. 9 shows operations of the first pixel circuit 10a in the case where it is driven according to the signals shown in FIG. 4. As shown in FIG. 9, the first pixel circuit 10a performs (a) reset, (b) accumulation, (c) retention, and (d) readout, during one frame period.

Figure 10:
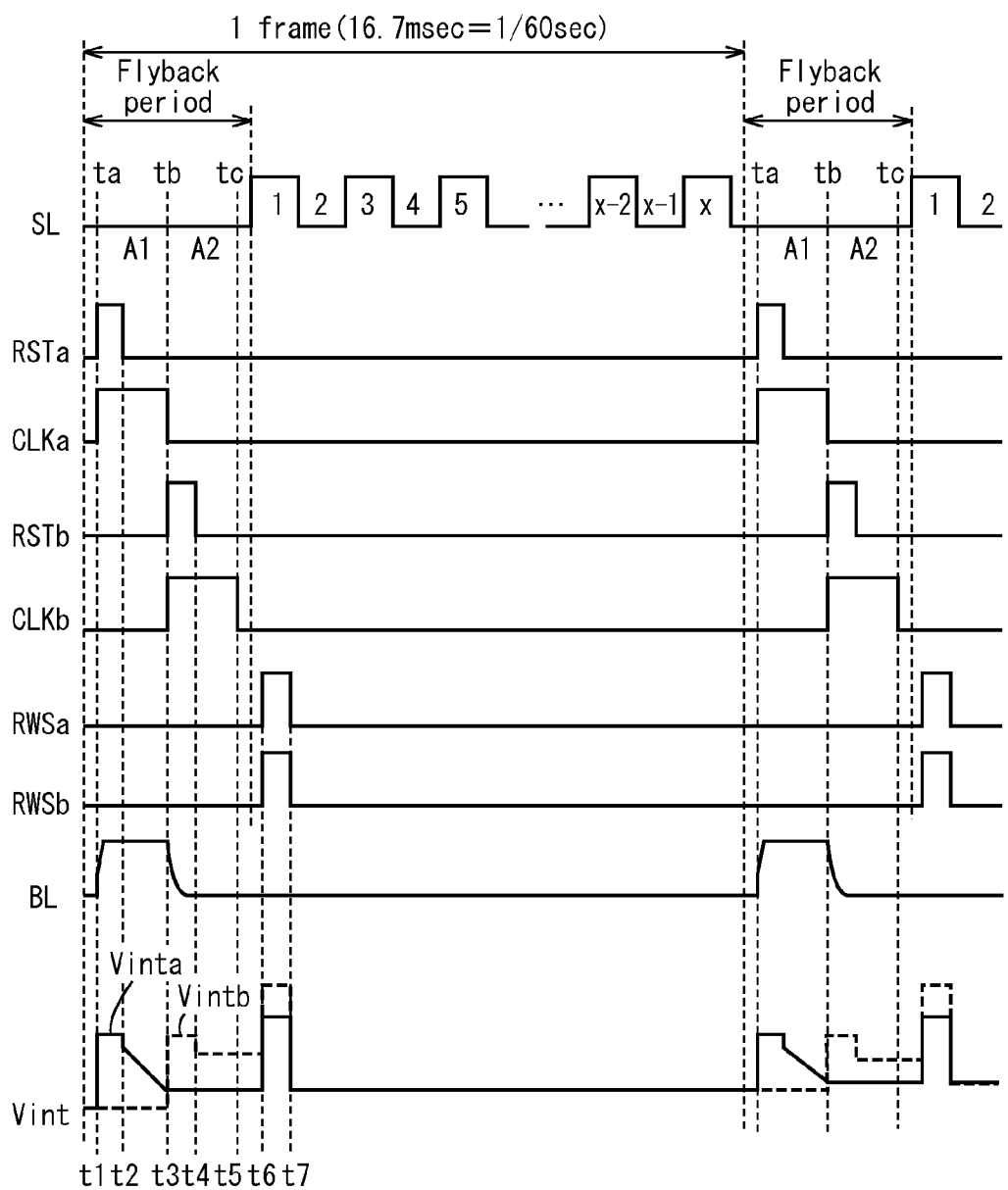
FIG. 10 is a signal waveform diagram of the sensor pixel circuit shown in FIG. 6.

FIG. 10 is a signal waveform diagram of the first pixel circuit 10a and the second pixel circuit 10b in the case where they are driven according to the signals shown in FIG. 4. In FIG. 10, "BL" represents a luminance of the backlight 3, "Vinta" represents a potential of the accumulation node of the first pixel circuit 10a (a gate potential of the transistor M1a), and "Vintb" represents a potential of the accumulation node of the second pixel circuit 10b (a gate potential of the transistor M1b). As to the first pixel circuit 10a, a period from a time t1 to a time t2 is a reset period, a period from the time t2 to a time t3 is an accumulation period, a period from the time t3 to a time t6 is a retention period, and a period from the time t6 to a time t7 is a readout period. As to the second pixel circuit 10b, a period from the time t3 to a time t4 is a reset period, a period from the time t4 to a time t5 is an accumulation period, a period from the time t5 to the time t6 is a retention period, and a period from the time t6 to the time t7 is a readout period. It should be noted that in FIG. 10, times at which the clock signal CLKa and the clock signal CLKb are switched from a high level to a low level coincide with the time ta and the time tb, respectively. Actually, however, the times at which the clock signal CLKa and the clock signal CLKb are switched from a high level to a low level are preferably slightly before the time ta and the time tb, respectively.

During the reset period for the first pixel circuit 10a, the clock signal CLKa are at a high level, the readout signal RWSa is at a low level, and the reset signal RSTa is at a high level for reset. Here, the transistor T1a is turned on. Therefore, an electric current (forward current of the photodiode D1a) flows from the reset line RSTa via the photodiode D1a and the transistor T1a to the accumulation node ((a) of FIG. 9), whereby the potential Vinta is reset to a predetermined level.

During the accumulation period for the first pixel circuit 10a, the clock signal CLKa is at the high level, and the reset signal RSTa and the readout signal RWSa are at low levels. Here, the transistor T1a is turned on. When light is incident on the photodiode D1a in this state, an electric current (photoelectric current of the photodiode D1a) flows from the accumulation node via the transistor T1a and the photodiode D1a to the reset line RSTa, and charges are withdrawn out of the accumulation node ((b) of FIG. 9). Therefore, the potential Vinta falls according to an amount of light incident during a period while the clock signal CLKa is at the high level (ON time of the backlight 3).

During the retention period for the first pixel circuit 10a, the clock signal CLKa, the reset signal RSTa, and the readout signal RWSa are at low levels. Here, the transistor T1a is turned off. Here, even if light is incident on the photodiode D1a, the potential Vinta does not change, since the transistor T1a is in an OFF state and the photodiode D1a and the gate of the transistor M1 are electrically disconnected ((c) of FIG. 9).

During the readout period for the first pixel circuit 10a, the clock signal CLKa and the reset signal RSTa are at low levels, and the readout signal RWSa is at a high level for readout. Here, the transistor T1a is turned off. Here, the potential Vinta rises by (Cqa/Cpa) time an amount of rise of the potential of the readout signal RWSa (where Cpa represents a value of a capacitance of the first pixel circuit 9a as a whole, and Cqa represents a value of a capacitance of the capacitor C1a). The transistor M1a forms a source follower amplifying circuit that has, as its load, a transistor (not shown) included in the source driver circuit 6, and drives the output line OUTa according to the potential Vinta ((d) of FIG. 9).

The second sensor pixel circuit 10b operates in the same manner as the first sensor pixel circuit 10a. The potential Vintb is reset to a predetermined level during the reset period; during the accumulation period, the potential Vintb falls according to an amount of light that is incident during a period while the clock signal CLKb is at a high level (OFF time of the backlight 3); and during the retention period, it does not change. During the readout period, the potential Vintb rises by (Cqb/Cpb) time an amount of rise of the potential of the readout signal RWSb (where Cpb represents a value of a capacitance of the second pixel circuit 10b as a whole, and Cqb represents a value of a capacitance of the capacitor C1b). The transistor M1b drives the output line OUTb according to the potential Vintb.

As described above, the first sensor pixel circuit 10a according to the present embodiment includes one photodiode D1a (optical sensor), one accumulation node in which charges corresponding to an amount of light detected are accumulated, the transistor M1a (readout transistor) having a control terminal connected to the accumulation node, and the transistor T1a (switching element for retention) that is provided on a path of an electric current flowing through the photodiode D1a and is turned on/off according to the clock signal CLK. The transistor T1a is provided between the accumulation node and a terminal of the photodiode D1a, and the other end of the photodiode D1a is connected to the reset line RSTa. The transistor T1a is turned on during the detection period in the backlight ON time, according to the clock signal CLKa. The second pixel circuit 10b has the same configuration as that of the first pixel circuit 10a, and the transistor T1b included in the second pixel circuit 10b is turned on during the detection period in the backlight OFF time.

By thus providing the transistor T1a, which is turned on during the detection period in the backlight ON time, on a path of an electric current flowing through the photodiode D1a, and providing the transistor T1b, which is turned on during the detection period in the backlight OFF time, on a path of an electric current flowing through the photodiode D1b, the first pixel circuit 10a and the second pixel circuit 10b are provided so that the first pixel circuit 10a detects light during the detection period in the backlight ON time and retains the detected light amount during the other period, and the second pixel circuit 10b detects light during the detection period in the backlight OFF time and retains the detected light amount during the other period.

Therefore, using the first and second pixel circuits 10a and 10b, the amount of light during the backlight ON time and the amount of light during the backlight OFF time can be detected individually and a difference between these can be determined outside the pixel circuits. This makes it possible to provide an input function that is not dependent on light environments.

The first and second pixel circuits 10a and 10b further include the capacitors C1a and C1b, respectively, which are provided between the accumulation node and the readout line RWSa, and between the accumulation and the readout line RWSb, respectively. Therefore, by applying a readout potential to the readout lines RWSa and RWSb, the potential of the accumulation node is caused to vary, and signals according to the amount of detected light can be read out from the first and second pixel circuits 10a and 10b, respectively.

Further, the display panel 2 further includes a plurality of output lines OUT1 to OUTm that transmit output signals of the first and second pixel circuits 10a and 10b, and the first pixel circuits 10a and the second pixel circuits 10b are connected to the output lines of the different types, respectively. Therefore, the readout from the first pixel circuits 10a and the readout from the second pixel circuits 10b can be carried out in parallel, whereby the readout speed can be decreased and the power consumption of the device can be reduced.

Figure 11:
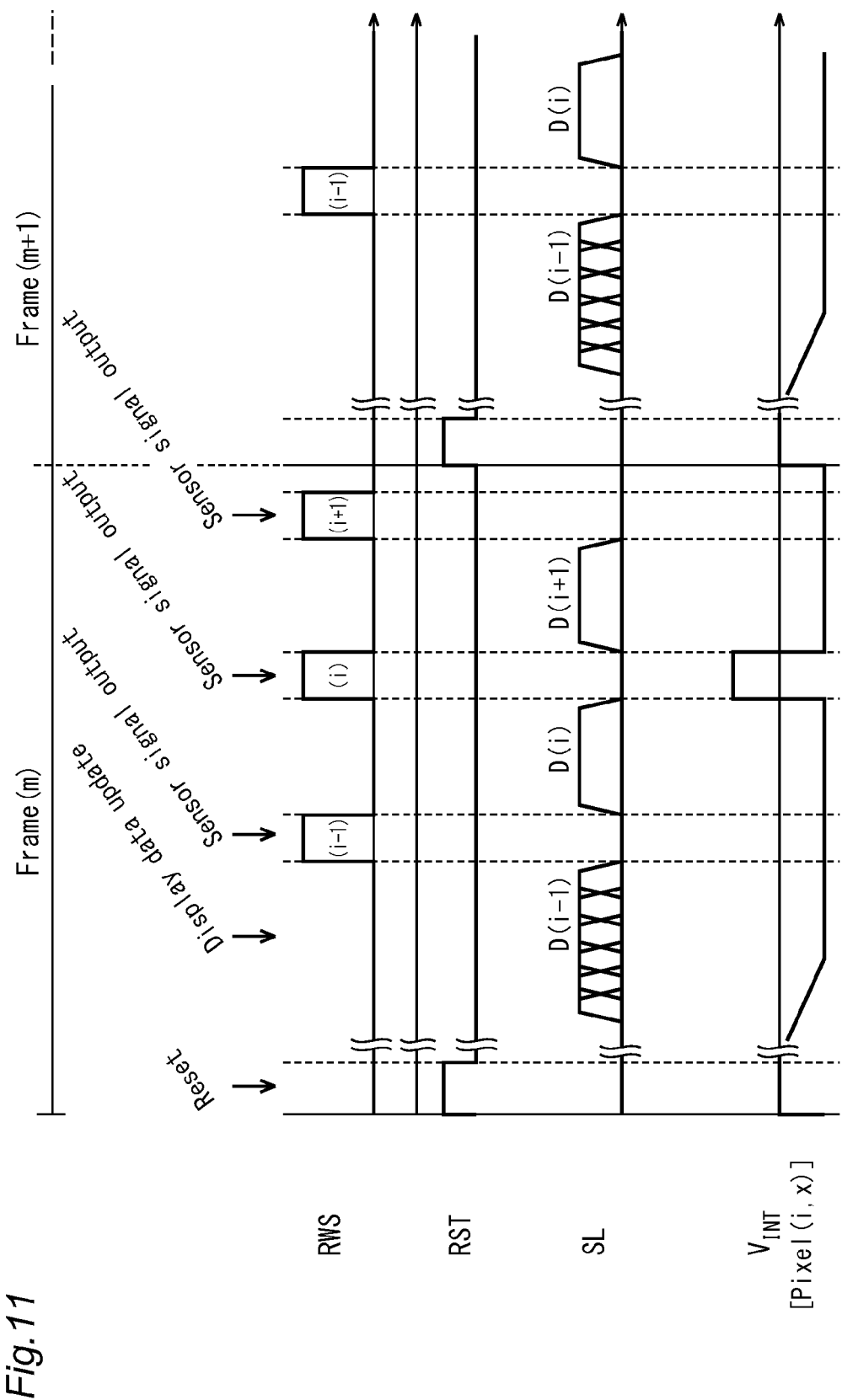
FIG. 11 is a timing chart showing readout timings of the sensor in Embodiment 1.

FIG. 11 is a timing chart showing readout timings for the sensor pixel circuits in the display device of the present embodiment. As shown in FIG. 11, the readout of the potentials Vinta and Vintb from the first pixel circuit 10a and the second pixel circuit 10b is carried out during a period (horizontal synchronization period) while the data signal writing to the source line SL is not carried out during a horizontal period. It should be noted that as shown in FIGS. 11 as well as FIGS. 4 and 10 mentioned above, the first pixel circuit 10*a* and the second pixel circuit 10*b* are reset during the vertical flyback period in the display panel 2. This causes no noise component due to fluctuations of a potential of the source line SL to be generated in the potential Vint of the accumulation node upon the reset of the first pixel circuit 10*a* and the second pixel circuit 10*b*. This makes it possible to obtain a high-precision sensor output.

Exemplary Modification of Embodiment 1

Figure 12:
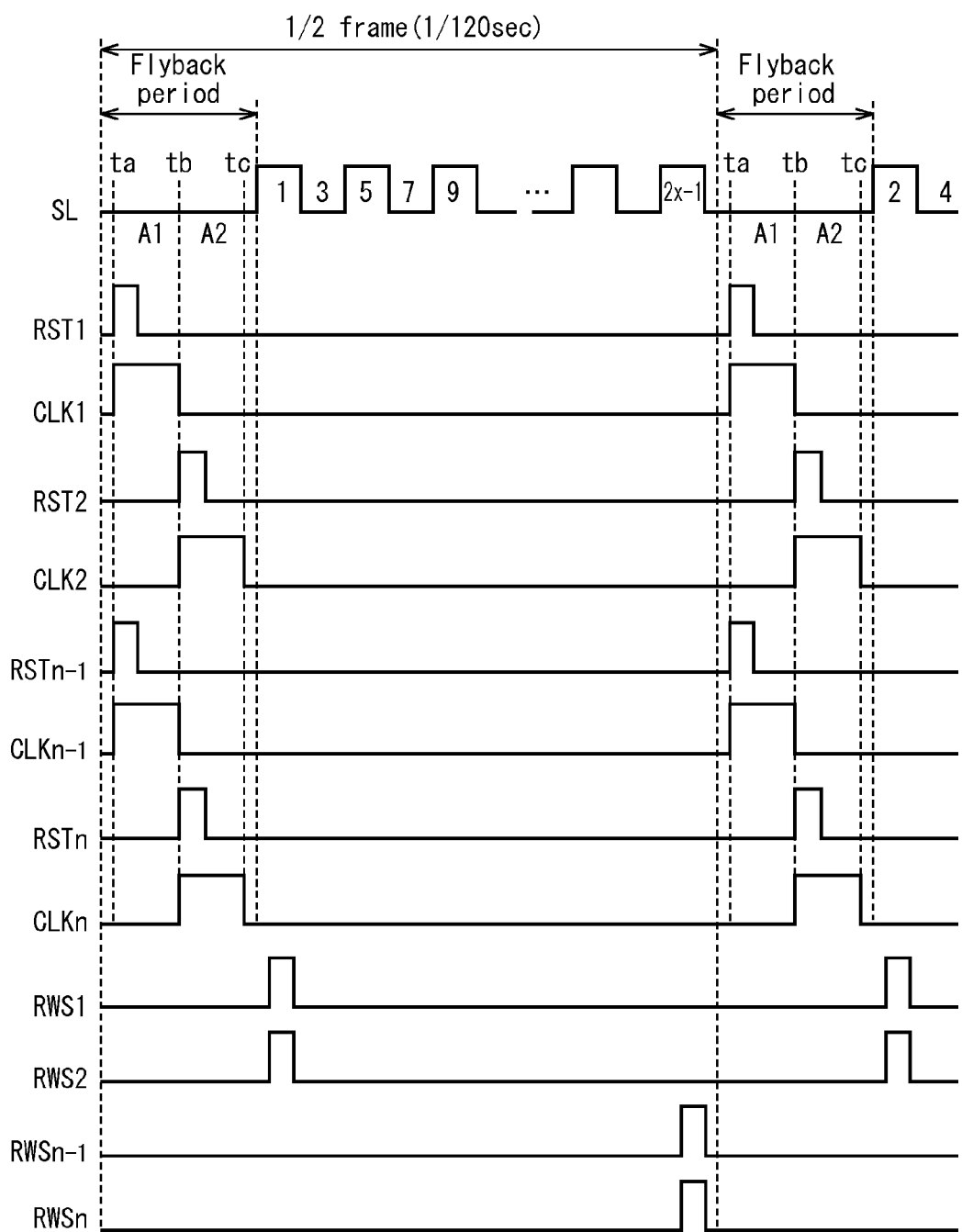
FIG. 12 is a timing chart showing an exemplary modification of a driving method in the display device according to Embodiment 1.

FIG. 12 is a timing chart showing an exemplary modification of a driving method in the display device according to Embodiment 1. The example shown in FIG. 12 is a driving method by the so-called interlace driving, by which odd-number-th rows of display pixels are scanned during a former half of one frame, and even-number-th display pixels are scanned during a latter half of one frame.

In the case of a normal pixel driving different from the interlace driving, the vertical flyback period exists once in one frame, and it is necessary to drive the sensors at the same frequency (60 Hz) as that for the display. Therefore, it is difficult to carry out higher-speed sensing. On the other hand, in the case of display by the interlace driving as is the case with the example shown in FIG. 12, two vertical flyback periods exist during one frame. Therefore, it is possible to drive the sensors at a speed twice the display frequency (120 Hz).

In this case as well, as shown in FIG. 12, the first pixel circuit 10*a* and the second pixel 10*b* are reset during the vertical flyback periods. As a result, no noise component is generated in the potential Vint of the accumulation node, due to fluctuations of a potential of the source line SL, during the reset periods. This makes it possible to obtain a high-precision sensor output.

Embodiment 2

Figure 13:
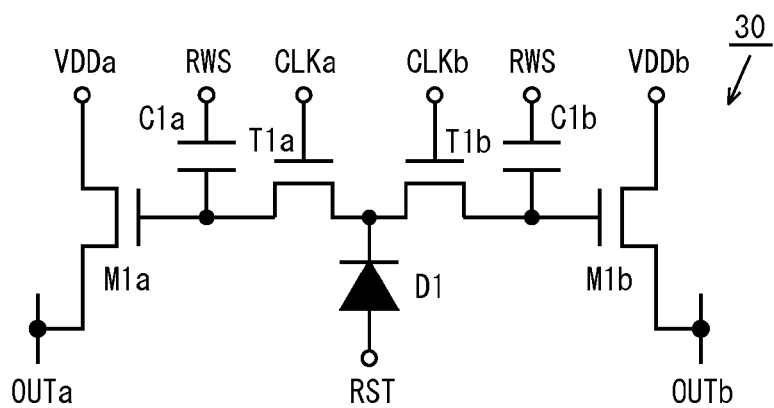
FIG. 13 is a circuit diagram of a sensor pixel circuit according to Embodiment 2 of the present invention.

FIG. 13 is a circuit diagram of a pixel circuit according to Embodiment 2 of the present invention. The pixel circuit 30 shown in FIG. 13 includes transistors T1*a*, T1*b*, M1*a*, and M1*b*, a photodiode D1*a*, and capacitors C1*a* and C1*b*. The transistors T1*a*, T1*b*, M1*a*, and M1*b* are N-type TFTs. In FIG. 13, the part in the left-side half is equivalent to the first pixel circuit, and the part in the right-side half is equivalent to the second pixel circuit. The pixel circuit 30 is connected to clock lines CLKa and CLKb, a reset line RST, readout line RWS, power source lines VDDa and VDDb, and output lines OUTa and OUTb. The power source VDDa and VDDb, and the output lines OUTa and OUTb double as source lines SL.

Figure 14:
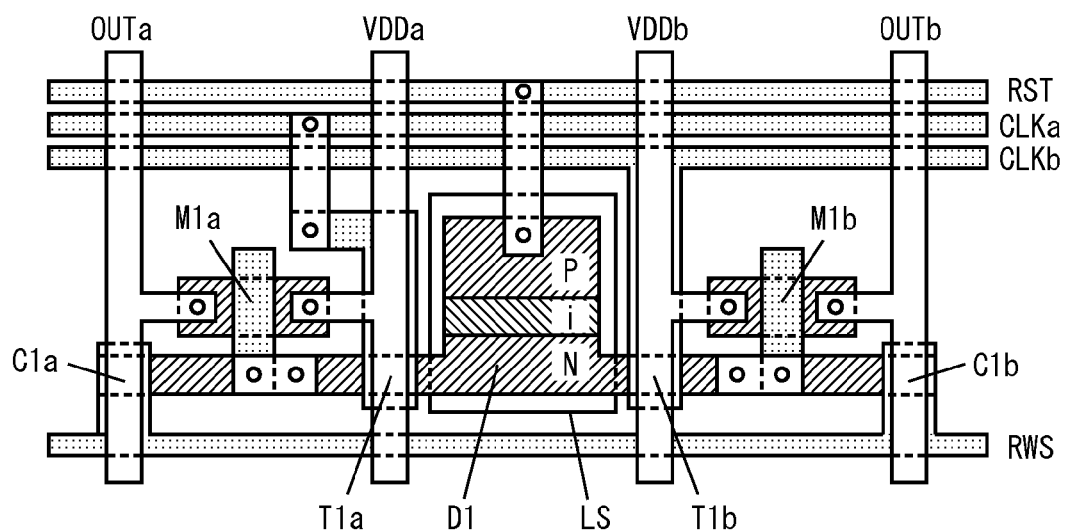
FIG. 14 is a layout diagram of the sensor pixel circuit shown in FIG. 13.

As shown in FIG. 13, an anode of the photodiode D1 is connected to the reset line RST, and a cathode thereof is connected to sources of the transistors T1*a* and T1*b*. A gate of the transistor T1*a* is connected to the clock line CLKa, and a drain thereof is connected to a gate of the transistor M1*a*. A drain of the transistor M1*a* is connected to the power source line VDDa, and a source thereof is connected to the output line OUTa. The capacitor C1*a* is provided between the gate of the transistor M1*a* and the readout line RWSa. A gate of the transistor T1*b* is connected to the clock line CLKb, and a drain thereof is connected to a gate of the transistor M1*b*. A drain of the transistor M1*b* is connected to the power source line VDDb, and a source thereof is connected to the output line OUTb. The capacitor C1*b* is provided between the gate of the transistor M1*b* and the readout line RWS. In the pixel circuit 30, a node connected to the gate of the transistor M1*a* functions as a first accumulation node, a node connected to the gate of the transistor M1*b* functions as a second accumulation node, and the transistors M1*a* and M1*b* function as readout transistors. FIG. 14 is a layout diagram of the pixel circuit 30. Explanation of FIG. 14 is the same as that made in the description of Embodiment 1.

Figure 15:
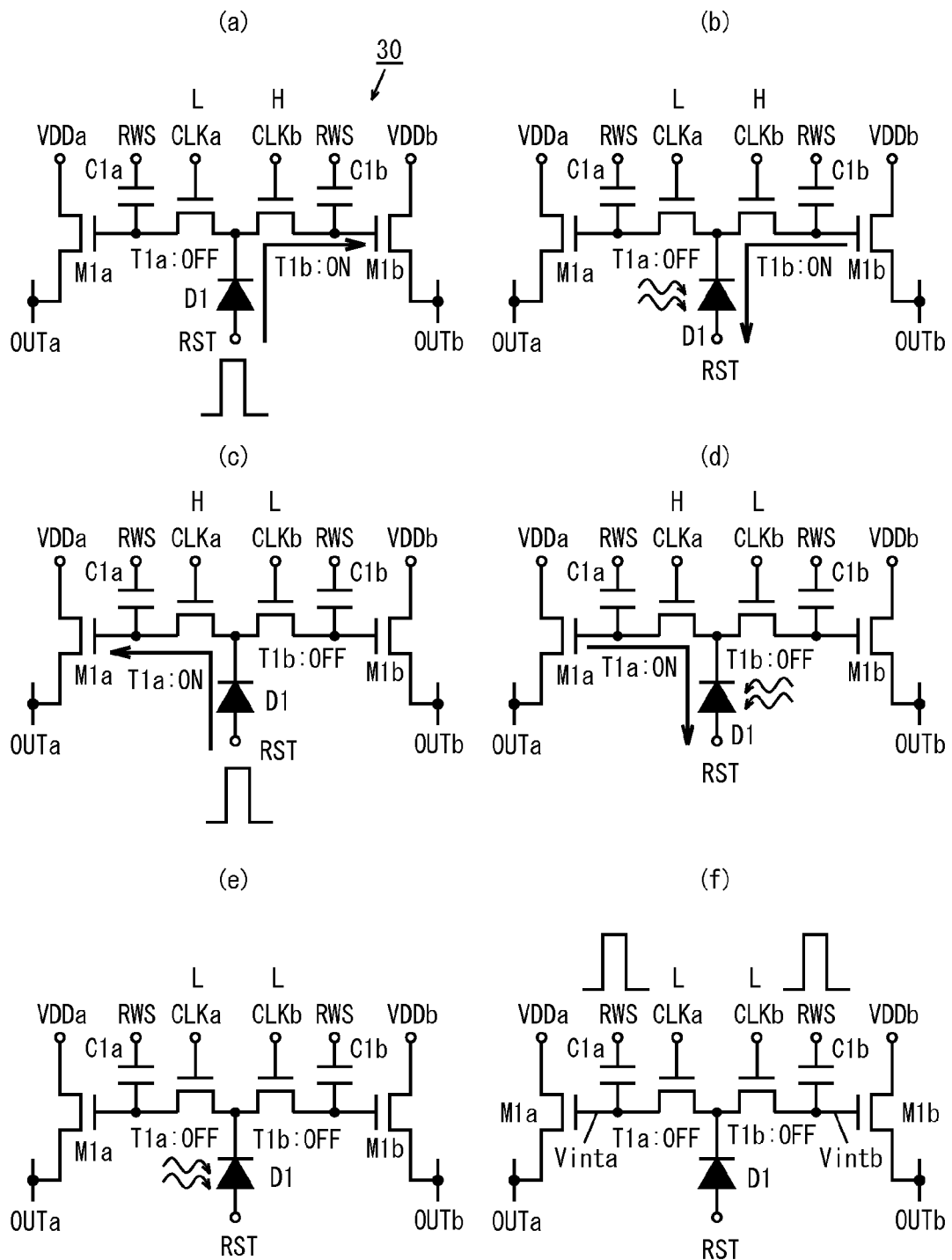
FIG. 15 shows operations of the sensor pixel circuit shown in FIG. 13.

FIG. 15 shows operations of the pixel circuit 30. The pixel circuit 30 performs (a) reset in the backlight ON time, (b) accumulation in the backlight ON time, (c) reset in the backlight OFF time, (d) accumulation in the backlight OFF time, (e) retention, and (0 readout, during one frame period.

Figure 16:
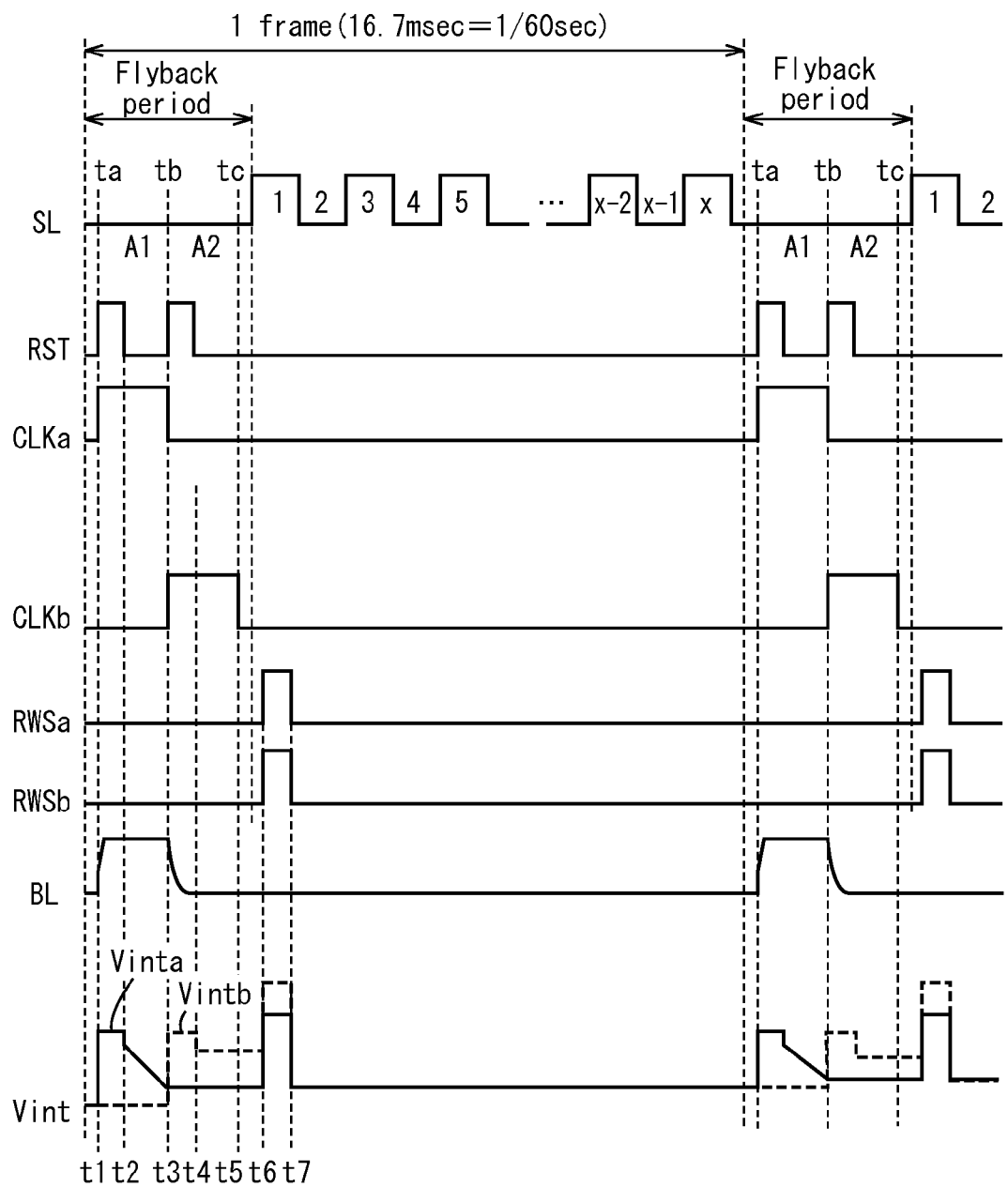
FIG. 16 is a signal waveform diagram of the sensor pixel circuit shown in FIG. 13.

FIG. 16 is a signal waveform diagram of the pixel circuit 30. In FIG. 16, "Vinta" represents a potential of the first accumulation node (a gate potential of the transistor M1*a*), and "Vintb" represents a potential of the second accumulation node (a gate potential of the transistor M1*b*). In FIG. 16, a period from the time t1 to a time t2 is a reset period in the backlight ON time, a period from the time t2 to a time t3 is an accumulation period in the backlight ON time, a period from the time t3 to a time t4 is a reset period in the backlight OFF time, a period from the time t4 to a time t5 is an accumulation period in the backlight OFF time, a period from the time t3 to a time t6 and a period from the time t5 to the time t6 are retention periods, and a period from the time t6 to a time t7 is a readout period.

During the reset period in the backlight ON time, the clock signal CLKa is at a high level, the clock signal CLKb and the readout signals RWS are at low levels, and the reset signal RST is at a high level for reset. Here, the transistor T1*a* is turned on, and the transistor T1*b* is turned off. Therefore, an electric current (forward current of the photodiode D1) flows from the reset line RST via the photodiode D1 and the transistor T1*a* to the first accumulation node ((a) of FIG. 15), whereby the potential Vinta is reset to a predetermined level.

During the accumulation period in the backlight ON time, the clock signal CLKa is at the high level, and the clock signal CLKb, the reset signal RST and the readout signals RWS are at low levels. Here, the transistor T1*a* is turned on, and the transistor T1*b* is turned off. When light is incident on the photodiode D1 in this state, an electric current (photoelectric current of the photodiode D1) flows from the first accumulation node via the transistor T1*a* and the photodiode D1 to the reset line RST, and charges are withdrawn out of the first accumulation node ((b) of FIG. 15). Therefore, the potential Vinta falls according to an amount of light incident during this period (ON time of the backlight 3). It should be noted that the potential Vintb does not change during this period.

During the reset period in the backlight OFF time, the clock signal CLKb is at a high level, the clock signal CLKa and the readout signals RWS are at low levels, and the reset signal RST is at a high level for reset. Here, the transistor T1*a* is turned off, and the transistor T1*b* is turned on. Therefore, an electric current (forward current of the photodiode D1) flows from the reset line RST via the photodiode D1 and the transistor T1*b* to the second accumulation node ((c) of FIG. 15), whereby the potential Vintb is reset to a predetermined level.

During the accumulation period in the backlight OFF time, the clock signal CLKb is at the high level, and the clock signal CLKa, the reset signal RST and the readout signals RWS are at low levels. Here, the transistor T1*a* is turned off, and the transistor T1*b* is turned on. When light is incident on the photodiode D1 in this state, an electric current (photoelectric current of the photodiode D1) flows from the second accumulation node via the transistor T1*b* and the photodiode D1 to the reset line RST, and charges are withdrawn out of the second accumulation node ((d) of FIG. 15). Therefore, the potential Vintb falls according to an amount of light incident during this period (OFF time of the backlight 3). It should be noted that the potential Vinta does not change during this period.

During the retention period, the clock signals CLKa and CLKb, the reset signal RST, and the readout signals RWS are at low levels. Here, the transistors T1a and T1b are turned off. Here, even if light is incident on the photodiode D1, the potentials Vinta and Vintb do not change, since the transistors T1a and T1b are in an OFF state and the photodiode D1 and the gates of the transistors M1a and M1b are electrically disconnected ((e) of FIG. 15).

During the readout period, the clock signals CLKa and CLKb and the reset signal RST are at low levels, and the readout signal RWS is at a high level for readout. Here, the transistors T1a and T1b are turned off. Here, the potentials Vinta and Vintb rise by an amount of rise of the potential of the readout signals RWS. An electric current Ia corresponding to the potential Vinta flows between the drain and the source of the transistor M1a, and an electric current Ib corresponding to the potential Vintb flows between the drain and the source of the transistor M1b ((f) of FIG. 15). The electric current Ia is input to the source driver circuit 6 via the output line OUTa, and the electric current Ib is input to the source driver circuit 6 via the output line OUTb.

As described above, the pixel circuit 30 according to the present embodiment has such a configuration that the first and second pixel circuits 10a and 10b according to Embodiment 1 share one photodiode D1 (optical sensor). The cathode of the photodiode D1 thus shared is connected to the source of the transistor T1a included in a part equivalent to the first pixel circuit, and to the source of the transistor T1b included in a part equivalent to the second pixel circuit.

With the pixel circuit 30, it is possible to detect an amount of light during the backlight ON time and an amount of light during the backlight OFF time, as is the case with the first and second pixel circuits 10a and 10b according to Embodiment 1. This makes it possible to obtain the same effect as that in Embodiment 1. Besides, since one photodiode D1 is shared by two pixel circuits of different types, the pixel circuits of the two types by no means have any photodiode characteristic difference therebetween. This makes it possible to determine a difference between an amount of light in the backlight ON time and an amount of light in the backlight OFF time accurately. Further, this also makes it possible to decrease the number of photodiodes, and increase the aperture ratio, thereby increasing the sensitivity of the sensor pixel circuits.

In the present embodiment also, the reset of the pixel circuit 30 is carried out during the vertical flyback period, as shown in FIG. 16. Upon the reset of the pixel circuit 30, no noise component due to fluctuations of a potential of the source line SL is not generated in the potential Vint of the accumulation node. This makes it possible to obtain a high-precision sensor output.

Exemplary Modification of Embodiment 2

Figure 17:
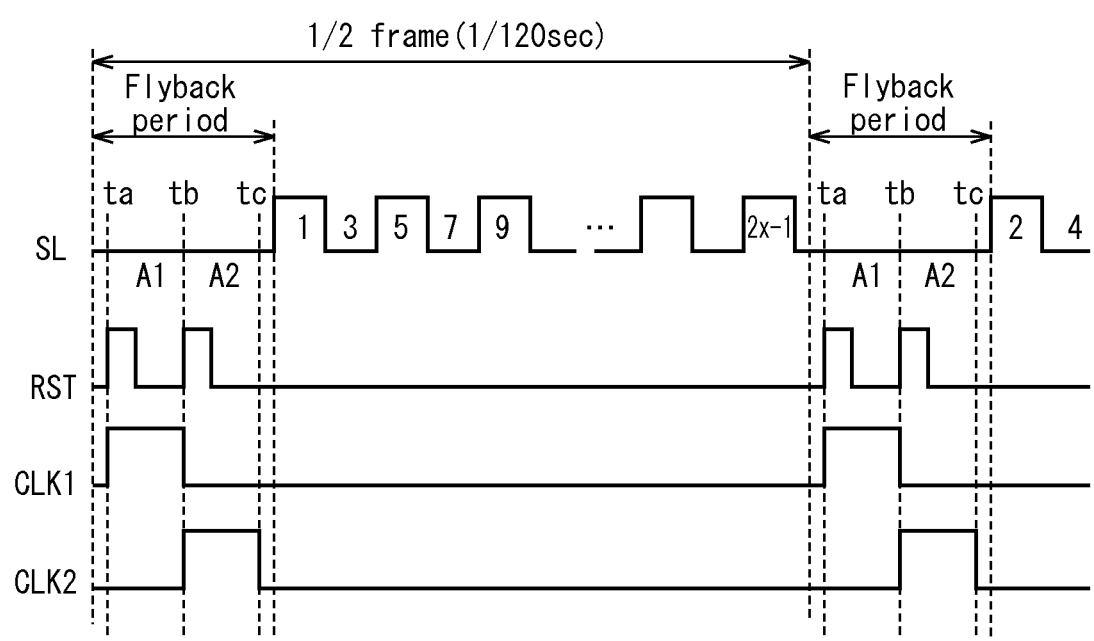
FIG. 17 is a timing chart showing an exemplary modification of a driving method in the display device according to Embodiment 2.

In Embodiment 2 as well, the reset of the pixel circuit 30 may be carried out in the vertical flyback period as shown in FIG. 17, in the case where the interlace driving is performed with respect to the display pixel circuits, as is the case with the exemplary modification of Embodiment 1, which is explained with reference to FIG. 12. In this exemplary modification also, no noise component due to fluctuations of a potential of the source line SL is not generated in the potential Vint of the accumulation node, during the reset period. Therefore, a high-precision sensor output can be obtained.

Exemplary Modification of Circuit Configuration

Figure 18A:
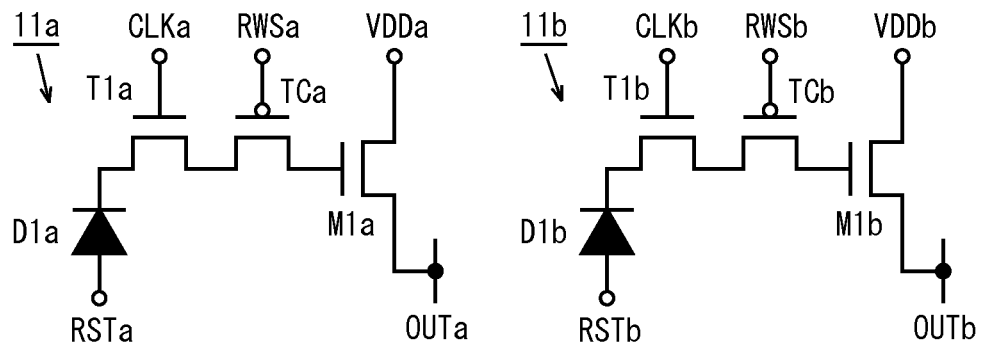
FIG. 18A is a circuit diagram of a sensor pixel circuit according to a first exemplary modification of Embodiment 1.
Figure 18B:
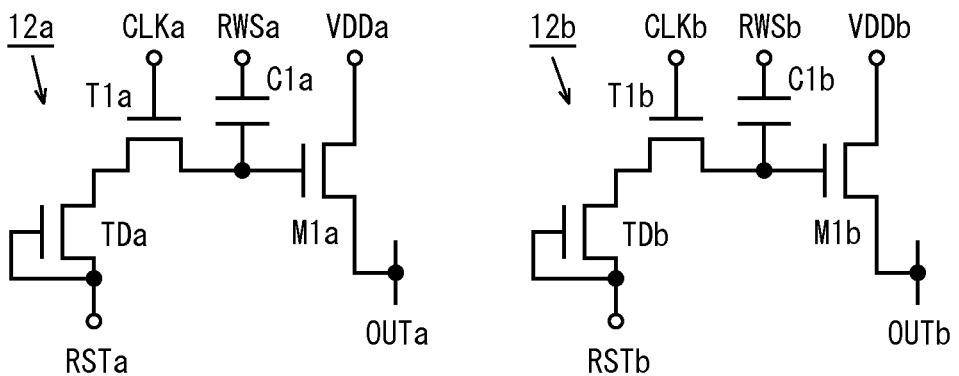
FIG. 18B is a circuit diagram of a sensor pixel circuit according to a second exemplary modification of Embodiment 1.
Figure 18C:
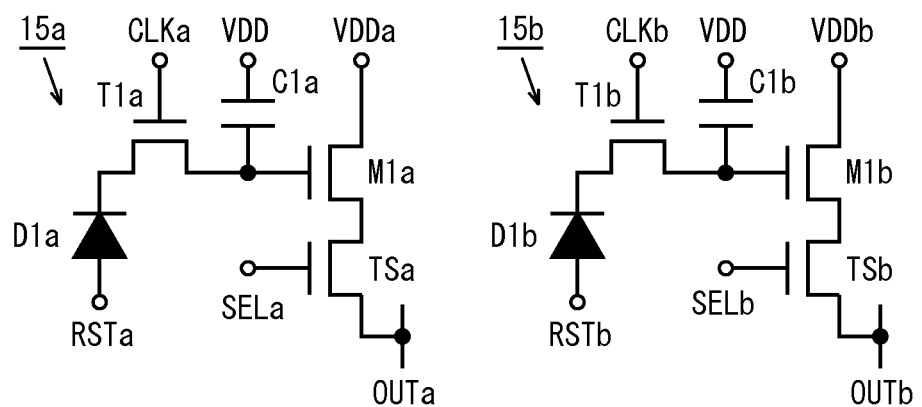
FIG. 18C is a circuit diagram of a sensor pixel circuit according to a third exemplary modification of Embodiment 1.

Regarding the circuit configuration explained with reference to FIG. 6 in the description of Embodiment 1, an exemplary modification can be formed as described below. FIGS. 18A to 18C are circuit diagrams of pixel circuits according to first to fifth exemplary modifications of Embodiment 1. First pixel circuits 11a, 12a, and 15a shown in FIGS. 18A to 18C are obtained by modifying the first pixel circuit 10a according to Embodiment 1 in the manner described below. Second pixel circuit 11b, 12b, and 15b are obtained by modifying the second pixel circuit 10b according to Embodiment 1 in the same manner.

Figure 21A:
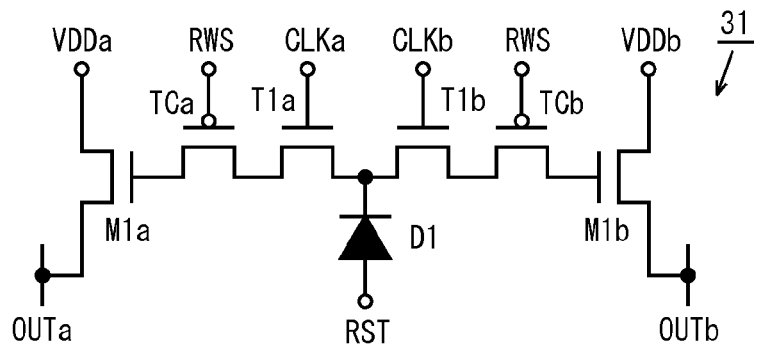
FIG. 21A is a circuit diagram of a sensor pixel circuit according to a first exemplary modification of Embodiment 2.

The first pixel circuit 11a shown in FIG. 18A has such a configuration that the capacitor C1 included in the first pixel circuit 10a is replaced with a transistor TCa that is a P-type TFT In the first pixel circuit 11a, the drain of the transistor TCa is connected to the drain of the transistor T1a, the source thereof is connected to the gate of the transistor M1a, and the gate thereof is connected to the readout line RWSa. The transistor TCa thus connected causes the potential of the accumulation node to change more significantly than the original pixel circuit, when a high-level potential for readout is applied to the readout line RWSa. Therefore, this amplifies the difference between the potential of the accumulation node when strong light is incident and the potential of the accumulation node when weak light is incident, thereby improving the sensitivity of the pixel circuit 11a. By modifying the pixel circuit 30 of Embodiment 2 in the same manner, a pixel circuit 31 shown in FIG. 21A is obtained.

Figure 21B:
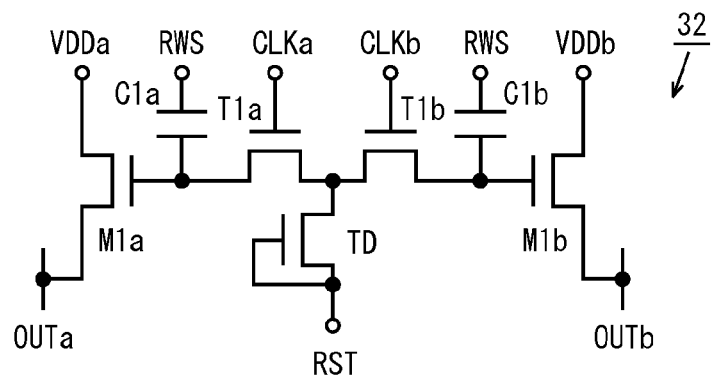
FIG. 21B is a circuit diagram of a sensor pixel circuit according to a second exemplary modification of Embodiment 2.

A first pixel circuit 12a shown in FIG. 18B has such a configuration that the photodiode D1 included in the first pixel circuit 10a is replaced with a photo-transistor TDa. This results in that all the transistors included in the first pixel circuit 12a are N-type. Therefore, the first pixel circuit 12a can be produced by single channel processing for producing N-type transistors alone. By modifying the pixel circuit of Embodiment 2 in the same manner, a pixel circuit 32 shown in FIG. 21B can be obtained.

Figure 21C:
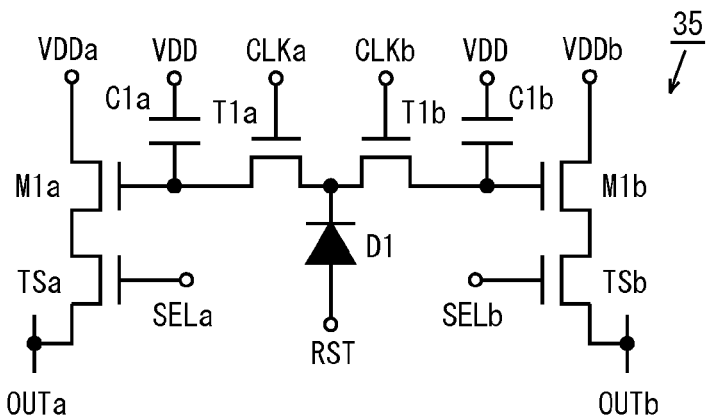
FIG. 21C is a circuit diagram of a sensor pixel circuit according to a third exemplary modification of Embodiment 2.
Figure 22:
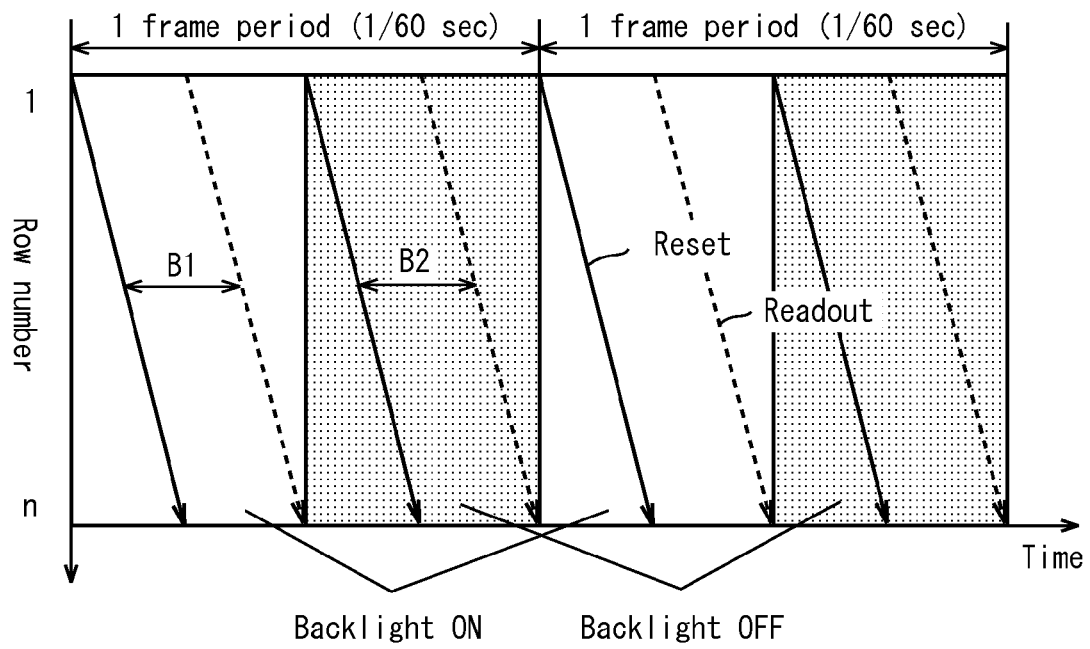
FIG. 22 shows backlight ON and OFF timings, and reset and readout timings with respect to light-receiving elements, in a conventional input/output device.
Figure 23:
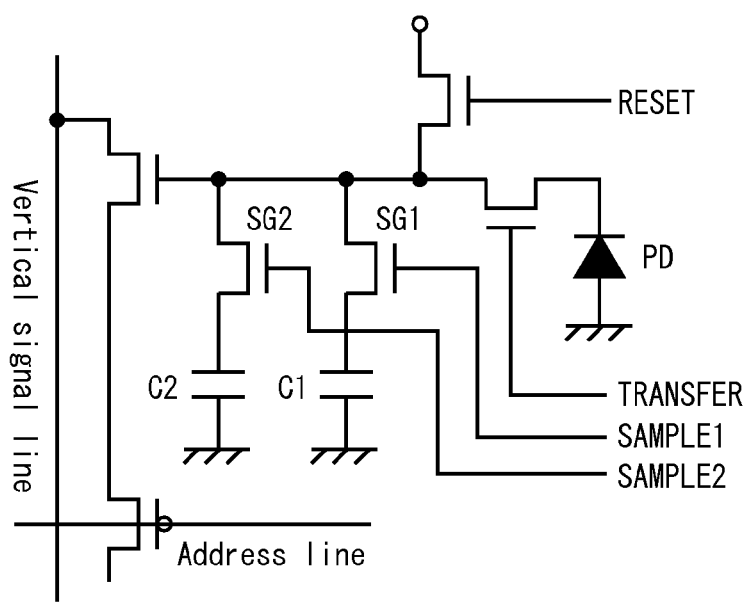
FIG. 23 is a circuit diagram of a unit light-receiving part included in a conventional solid image pickup device.

A first pixel circuit 15a shown in FIG. 18C has such a configuration that a transistor TSa is added to the first pixel circuit 10a. The transistor TSa is an N-type TFT, and functions as a switching element for selection. In the first pixel circuit 15a, the source of the transistor M1a is connected to the drain of the transistor TSa. The source of the transistor TSa is connected to the output line OUTa, and the gate thereof is connected to a selection line SELa. A selection signal SELa assumes a high level upon readout from the first pixel circuit 15a. The capacitor C1a is connected to the readout line RWSa in the first pixel circuit 10a, but it is connected to the power source line VDD in the first pixel circuit 15a. Thus, pixel circuit variations are obtained. By modifying the pixel circuit 30 of Embodiment 2 in the same manner, a pixel circuit 35 shown in FIG. 21C is obtained.

Figure 19:
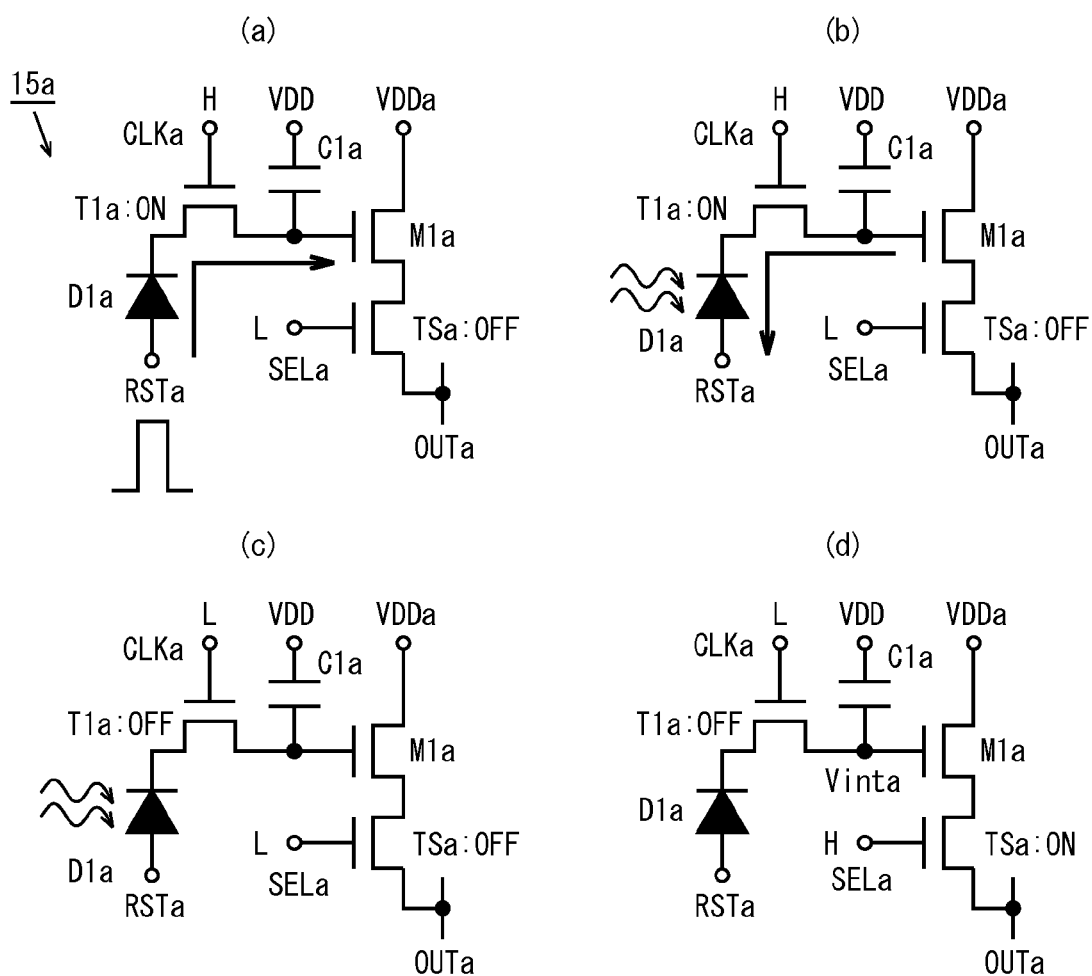
FIG. 19 shows operations of the sensor pixel circuit shown in FIG. 18C.
Figure 20:
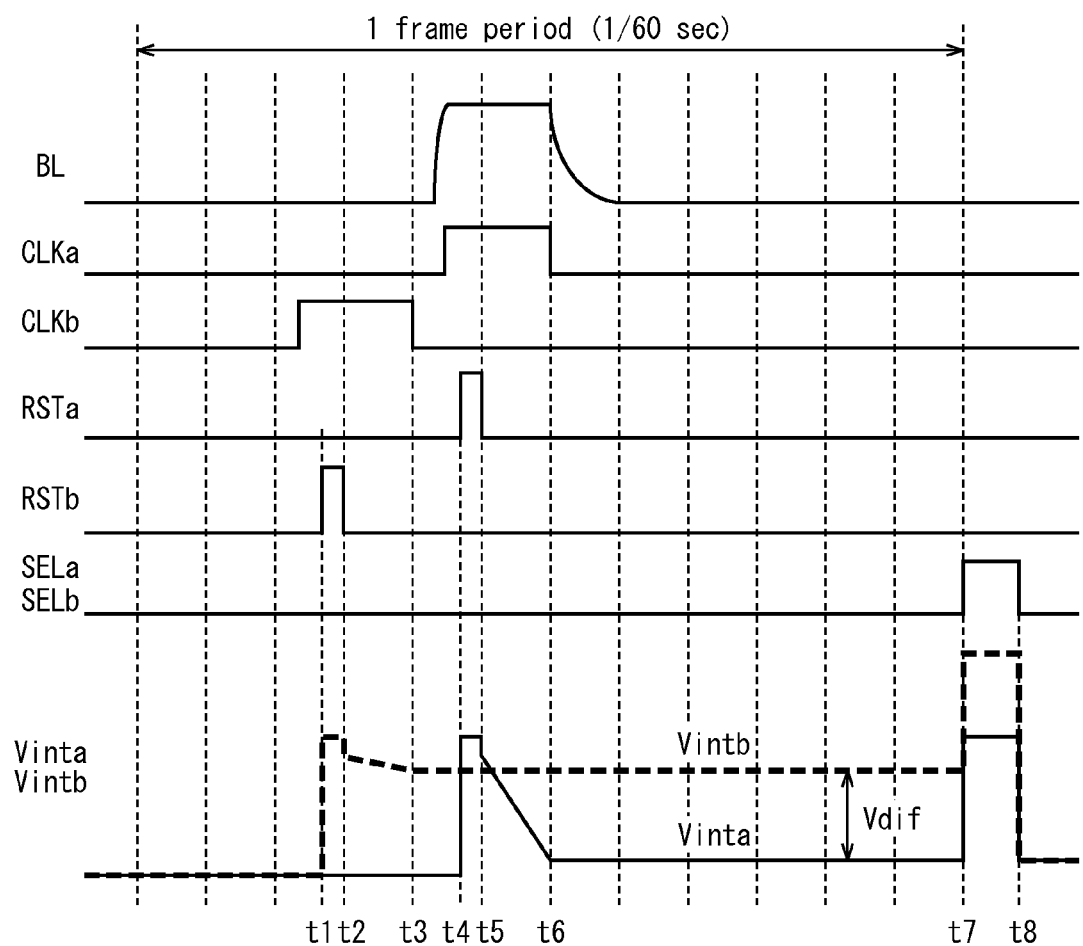
FIG. 20 is a signal waveform diagram of the sensor pixel circuit shown in FIG. 18C.

FIG. 19 shows operations of the first pixel circuit 15a. FIG. 20 is a signal waveform diagram of the first pixel circuits 15a and 15b. During periods other than the readout period, the selection signal SELa, is at a low level, the transistor TSa is in an OFF state, and the first pixel circuit 15a operates in the same manner as that of the first pixel circuit 10a ((a) to (c) of FIG. 19). During the readout period, the selection signal SELa is at a high level, and the transistor TSa is turned on. Here, an electric current Ia in an amount according to the potential Vinta flows between the drain and the source of the transistor M1a ((d) of FIG. 19).

As described above, each of the display devices according to the various embodiments and exemplary modification of the embodiments includes, separately: a first sensor pixel circuit that detects light during a detection period in a backlight ON time, and retains an amount of the detected light during the other period; and a second sensor pixel circuit that detects light during a detection period in a backlight OFF time, and retains an amount of the detected light during the other period. With this configuration, the display device according to any one of the above-described embodiments and exemplary modifications thereof is capable of determining a difference between amounts of light of two types outside the sensor pixel circuits, and detecting a difference between an amount of light in the backlight ON time and an amount of light in the backlight OFF time. Thus, the conventional problem is solved, and an input function that is not dependent on light environments can be provided.

Further, with use of the display device according to any one of the embodiments and exemplary modifications thereof described above, which resets the sensor pixel circuits during the vertical flyback period, it is possible to obtain a high-precision sensor output that is not affected by fluctuations of the potential of the source line SL.

It should be noted that the type of the light source provided in the display device is not limited particularly in the present invention. Therefore, for example, a visible-light backlight provided for display may be turned on/off. Alternatively, an infrared light backlight for light detection may be provided in the display device, in addition to the visible light backlight for display. In such a display device, the visible-light backlight may be maintained in an ON state always, and only the infrared light backlight may be turned on/off once during one frame period.

Industrial Applicability

The present invention is industrially applicable as a touch-sensor-equipped display device including an optical sensor.

The invention claimed is:

1. A display device including an active matrix substrate, the display device comprising:
   an optical sensor provided in a pixel region of the active matrix substrate;
   a sensor driving line connected to the optical sensor;
   a sensor driving circuit that supplies sensor driving signals including a reset signal and a readout signal via the sensor driving line to the optical sensor;
   an amplifying circuit that amplifies the signal read out from the optical sensor according to the sensor driving signals, and outputs the amplified signal as an optical sensor signal;
   a signal processing circuit that processes the optical sensor signal that is output from the amplifying circuit; and
   a light source for the optical sensor,
   wherein the optical sensor includes:
   a first sensor pixel circuit that, according to the sensor driving signals, accumulates electric charges corresponding to an amount of light received during an accumulation period in an ON time of the light source, and outputs a sensor signal corresponding to the accumulated electric charges when a readout period starts; and
   a second sensor pixel circuit that, according to the sensor driving signals, accumulates electric charges corresponding to an amount of light received during an accumulation period in an OFF time of the light source, and outputs a sensor signal corresponding to the accumulated electric charges when the readout period starts,
   wherein the sensor driving circuit supplies the reset signal to the optical sensor during a vertical flyback period in pixel display in the pixel region.

2. The display device according to claim 1, wherein the sensor driving signal further includes a control signal,
   wherein each of the first and second pixel circuits includes:
   one light-receiving element;
   one accumulation node that accumulates electric charges corresponding to an amount of light detected;
   a readout transistor having a control terminal that is electrically connectable to the accumulation node; and
   a switching element for retention that is provided on a path of an electric current flowing through the light-receiving element and that is turned on/off according to the control signal.

3. The display device according to claim 2, wherein the sensor driving line includes a reset line to which the reset signal is to be applied,
   wherein, in the first and second sensor pixel circuits,
   the switching element of retention is provided between the accumulation node and one terminal of the light-receiving element, and
   the other terminal of the light-receiving element is connected to the reset line.

4. The display device according to claim 1, wherein the sensor driving line includes a reset line to which the reset signal is to be applied,
   wherein the first and second sensor pixel circuits share one light-receiving element, and
   one terminal of the light-receiving element is connected to one terminal of a switching element for retention included in each of the first and second sensor pixel circuits, and the other terminal of the light-receiving element is connected to the reset line.

5. The display device according to claim 1,
   wherein interlace driving is performed with respect to pixels in the pixel region, and
   the sensor driving circuit supplies the reset signal to the optical sensor during the vertical flyback period, two of the vertical flyback periods being provided in one frame relating to pixel display in the pixel region.

6. The display device according to claim 1, wherein, in one frame period, the accumulation period in the ON time of the light source precedes the accumulation period in the OFF time of the light source.

7. The display device according to claim 1, further comprising:
   a counter substrate opposed to the active matrix substrate; and
   liquid crystal interposed between the active matrix substrate and the counter substrate.

* * * * *